(12) United States Patent
Zhou et al.

(10) Patent No.: US 8,542,587 B2
(45) Date of Patent: Sep. 24, 2013

(54) POLICY CONTROL METHOD AND SYSTEM FOR ACCESSING FIXED BROADBAND ACCESS NETWORK

(75) Inventors: Xiaoyun Zhou, Shenzhen (CN); Tong Rui, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 13/814,678

(22) PCT Filed: Jul. 25, 2011

(86) PCT No.: PCT/CN2011/077572
§ 371 (c)(1),
(2), (4) Date: Feb. 6, 2013

(87) PCT Pub. No.: WO2012/019507
PCT Pub. Date: Feb. 16, 2012

(65) Prior Publication Data
US 2013/0142046 A1    Jun. 6, 2013

(30) Foreign Application Priority Data
Aug. 12, 2010    (CN) .......................... 2010 1 0255023

(51) Int. Cl.
*H04W 28/02*    (2009.01)
(52) U.S. Cl.
USPC ......... 370/230; 370/328; 709/228; 455/432.1
(58) Field of Classification Search
None
See application file for complete search history.

(56) References Cited

U.S. PATENT DOCUMENTS 8,064,909 B2 * 11/2011 Spinelli et al. ................ 455/436
8,189,567 B2 * 5/2012 Kavanagh et al. ............ 370/352
(Continued)

FOREIGN PATENT DOCUMENTS

CN    1980409 A    6/2007
CN    101512971 A    8/2009

OTHER PUBLICATIONS

International Search Report in international application No. PCT/CN2011/077572, mailed on Nov. 3, 2011.

(Continued)

*Primary Examiner* — Min Jung
(74) *Attorney, Agent, or Firm* — Oppedahl Patent Law Firm LLC

(57) ABSTRACT

The disclosure provides a policy control method and a policy control system for accessing a fixed broadband access network. The policy control method includes: a FMC PF used for sensing the access of UE to a fixed broadband access network is set in a mobile network which a user requests to be accessed to; after the FMC PF receives a trigger message from an ePDG, the FMC PF requests a BPCF to establish a policy session, and the BPCF performs, policy control according to the information of the fixed broadband access network accessed by the UE. It can be seen from the method of the disclosure that when the UE is accessed to the 3GPP through the fixed broadband access network, the FMC PF senses a gateway control session establishment request message or a DHCP request message from the ePDG, so that a PCRF of the 3GPP access network accessed by the UE is triggered to send a policy session request to the BPCF. In this way, in the case that the fixed broadband access network fails to sense the access of the UE or that the fixed broadband access network does not support 3GPP-based access authentication in the conventional art where the UE is accessed to a 3GPP core network through the fixed broadband access network, QoS control is achieved for the access of the UE, and thus QoS guarantee is provided to the entire transmission path of data.

19 Claims, 18 Drawing Sheets

(56) References Cited

U.S. PATENT DOCUMENTS

| | | | |
|---|---|---|---|
| 8,477,607 B2* | 7/2013 | Liu et al. | 370/230 |
| 2008/0049648 A1* | 2/2008 | Liu et al. | 370/310 |
| 2010/0095003 A1* | 4/2010 | Zhao | 709/226 |
| 2010/0154029 A1* | 6/2010 | Fernandez Alonso et al. | 726/1 |
| 2010/0177780 A1* | 7/2010 | Ophir et al. | 370/401 |
| 2011/0103266 A1* | 5/2011 | Andreasen et al. | 370/259 |
| 2011/0283344 A1* | 11/2011 | Krishnan et al. | 726/5 |
| 2012/0265888 A1* | 10/2012 | Roeland et al. | 709/228 |
| 2013/0052995 A1* | 2/2013 | Shi | 455/411 |
| 2013/0103846 A1* | 4/2013 | Zhou et al. | 709/228 |
| 2013/0115919 A1* | 5/2013 | Xu et al. | 455/411 |

OTHER PUBLICATIONS

English Translation of the Written Opinion of the International Search Authority in international application No. PCT/CN2011/077572, mailed on Nov. 3, 2011.

* cited by examiner

POLICY CONTROL METHOD AND SYSTEM FOR ACCESSING FIXED BROADBAND ACCESS NETWORK

TECHNICAL FIELD

The disclosure relates to intercommunication between 3GPP and Broadband Forum (BBF), and in particular to a policy control method and a policy control system for accessing a fixed broadband access network.

BACKGROUND

FIG. 1 shows an architecture diagram of a current 3GPP Evolved Packet System (EPS). The EPS network architecture in a non-roaming scene shown in FIG. 1 includes an Evolved Universal Terrestrial Radio Access Network (E-UTRAN), a Mobility Management Entity (MME), a Serving Gateway (S-GW), a Packet Data Network Gateway (P-GW, also called PDN GW), a Home Subscriber Server (HSS), a Policy and Charging Rules Function (PCRF) and other support nodes.

The PCRF is the core of Policy and Charging Control (PCC) and is responsible for making policies and making charging rules. The PCRF provides network control rules which are based on service data stream, wherein the network control includes the detection, gating control, Quality of Service (QoS) control of the service data stream, the charging rules based on data stream and so on. The PCRF sends the policy and charging rules made by the PCRF itself to a Policy and Charging Enforcement Function (PCEF) to execute, meanwhile the PCRF has to guarantee the consistency between the rules and the subscription information of a user. The basis for the PCRF to make policy and charging rules includes: acquiring information related to service from Application Function (AF), acquiring the policy and charging control subscription information of a user from a Subscription Profile Repository (SPR), and acquiring network information related to bearer from the PCEF.

The EPS supports the interconnection with a non-3GPP system, which is implemented through S2a/b/c interfaces, wherein the P-GW serves as an anchor between the 3GPP system and the non-3GPP system. As shown in FIG. 1, the non-3GPP system is divided into trusted non-3GPP IP access and untrusted non-3GPP IP access, wherein the trusted non-3GPP IP access is connected directly to the P-GW via the S2a interface; while the untrusted non-3GPP IP access needs to be connected to the P-GW through an Evolved Packet Data Gateway (ePDG). The interface between the ePDG and the P-GW is the S2b interface, and Internet Protocol Security (IPSec) is adopted between the User Equipment (UE) and the ePDG to perform encryption protection on signalling and data. The S2c interface provides user-plane-related control and mobility support between the UE and the P-GW, wherein the supported mobility management protocol is Mobile IPv6 support for dual stack Hosts and Routers (DSMIPv6).

At present, many operators focus on Fixed Mobile Convergence (FMC) and research the intercommunication between 3GPP and BBF. For the scene that a user accesses a mobile core network through the BBF (that is, fixed broadband access network), it is needed to guarantee the QoS on the entire transmission path of data (the data would be transmitted through the fixed network and the mobile network). In the conventional art, interaction is implemented through the PCRF and a Broadband Policy Control Framework (BPCF) in the BBF access (that is, fixed broadband access network), so as to realize QoS guarantee. The BPCF is the policy control framework in the fixed broadband access network. For a resource request message from the PCRF, the BPCF performs resource admission control according to the network policy and subscription information of the fixed broadband access network, or forwards the resource request message to other network elements (for example, Broadband Network Gateway (BNG)) of the fixed broadband access network), and then this network element performs resource admission control (that is to say, the BPCF delegates other network elements to perform resource admission control). For example, when a UE accesses a 3GPP core network through a Wide Local Area Network (WLAN), in order to guarantee that the total bandwidth of the services accessed by all UEs which access the core network through one WLAN access line does not exceed the bandwidth of this line (for example, subscribed bandwidth or maximum physical bandwidth supported by this line), the PCRF needs to interact with the BPCF when performing QoS authorization, so that the fixed broadband access network performs the resource admission control. During specific implementation, the PCRF provides QoS rules for the BPCF and the fixed broadband access network performs admission control according to the QoS rules.

FIG. 2 shows a diagram illustrating the architecture in which a UE accesses a 3GPP core network through a fixed broadband access network according to the conventional art.

As shown in FIG. 2, the fixed broadband access network serves as the untrusted non-3GPP access. In the architecture shown in FIG. 2, after the UE is accessed to the fixed broadband access network, a Broadband Remote Access Server (BRAS)/BNG would perform 3GPP-based access authentication, meanwhile the BPCF of the BBF actively initiates an S9* session to interact with the PCRF of the 3GPP. Thus, the PCRF can interact with the BPCF when performing QoS authorization; and then the BPCF performs the resource admission control or delegates other network elements of the fixed broadband access network to perform the resource admission control.

However, in some scenes, the fixed broadband access network can not always sense the access of UE, or the fixed broadband access network does not support the 3GPP-based access authentication. In this case, the BPCF can not initiate the S9* session actively and thus can not implement the QoS control on the access of UE.

SUMMARY

In view of the above, the main purpose of the disclosure is to provide a policy control method and a policy control system for accessing a fixed broadband access network, which can implement the QoS control on the access of UE and thus provide QoS guarantee to the entire transmission path of data in the case that the fixed broadband access network fails to sense the access of UE or that the fixed broadband access network does not support 3GPP-based access authentication.

In order to achieve the purpose above, the technical scheme of the disclosure is realized as follows.

The disclosure provides a policy control method for accessing a fixed broadband access network, which includes: an FMC PF is set in a mobile network which a user requests to be accessed to, after the FMC PF receives a trigger message from an ePDG, the FMC PF requests a BPCF in the fixed broadband access network to establish a policy control session; and the fixed broadband access network performs admission control according to QoS rules or QoS information transmitted from the FMC PF through the policy control session.

The FMC PF may serve as a separate function entity, or may be integrated in a PCRF.

The trigger message received by the FMC PF from the ePDG may be: a gateway control session establishment message carrying IPSec external tunnel information or a Dynamic Host Configuration Protocol (DHCP) request message carrying IPSec external tunnel information, wherein the IPSec external tunnel information may include a UE local IP address received by the ePDG.

The processing that the FMC PF requests the BPCF to establish a policy control session may include: the FMC PF determines the BPCF of the fixed broadband access network accessed by the UE or the entry point of the fixed broadband access network in which the BPCF is located according to the UE local IP address, and sends an S9* session establishment message to the BPCF, wherein the S9* session establishment message may carried with the IPSec external tunnel information.

The IPSec external tunnel information may include a source port number.

When the user is a non-roaming user, the mobile network which the user requests to be accessed to may the Public Land Mobile Network (PLMN) to which the user belongs; when the user is a roaming user, the mobile network which the user requests to be accessed to may be the PLMN that the user visits.

The processing of requesting to establish a policy control session and the processing that the fixed broadband access network performs admission control may include: after the FMC PF acquires PCC rules, QoS rules or a QoS request, the FMC PF transmits the QoS rules or QoS information to the BPCF through the policy control session.

The FMC PF may serve as a separate function entity, and the processing that the FMC PF acquires the QoS rules or the QoS information may include: the FMC PF acquires the PCC rules or the QoS rules from a PCRF; or the FMC PF acquires the QoS request from the ePDG.

The FMC PF may be integrated in the PCRF, and the processing that the FMC PF acquires the PCC rules, the QoS rule or the QoS request may include: when the user is a non-roaming user, the PCRF makes the PCC rules and/or the QoS rules; when the user is a roaming user, the PCRF acquires the PCC rules or the QoS rules from a PCRF of the PLMN to which the user belongs; or the PCRF acquires the QoS request from the ePDG.

The processing that the fixed broadband access network performs resource admission control according to a request may include:

if the BPCF receives a request for allocating bandwidth resource GBR (Guaranteed Bit Rate), the fixed broadband access network performs the resource admission control according to the currently available bandwidth of a subscribed fixed-network line:
  when the rest available bandwidth is greater than or equal to the GBR, the fixed broadband access network accepts the request of the FMC PF of the mobile network which the user requests to be accessed to; the fixed broadband access network returns an acceptance acknowledgement message to the FMC PF of the mobile network which the user requests to be accessed to; and the fixed broadband access network deducts the GBR from the currently available bandwidth of the subscribed fixed-network line,
  when the rest available bandwidth is less than the GBR, the fixed broadband access network rejects the request of the FMC PF of the mobile network which the user requests to be accessed to; and the fixed broadband access network returns a rejection message to the FMC PF of the mobile network which the user requests to be accessed to, wherein the rejection message may be carried with the bandwidth that the fixed broadband access network can accept, If the BPCF receives a request for releasing the bandwidth resource GBR, the BPCF returns an acceptance acknowledgement message; and the fixed broadband access network adds the GBR to the currently available bandwidth of the subscribed fixed-network line.

If the FMC PF receives the rejection message, the method may further include: the FMC PF performs resource pre-emption according to an Allocation and Retention Priority (ARP).

The disclosure provides a policy control system for accessing a fixed broadband access network, which at least includes an ePDG, an FMC PF and a BPCF, wherein
the ePDG is configured to send a trigger message to the FMC PF;
the FMC PF is set in a mobile network which a user requests to be accessed to and is configured to receive the trigger message from the ePDG and to request the BPCF to establish a policy control session; and
the BPCF is configured to receive the request from the FMC PF and to perform admission control according to QoS rules or QoS information transmitted through the policy control session or to delegate another network element of the fixed broadband access network to perform the admission control.

The FMC PF may be configured to acquire PCC rules, QoS rules or a QoS request containing GBR, and to transmit the QoS rules or QoS information to the BPCF through the policy control session.

The FMC PF may serve as a separate function entity, the system may further include a PCRF which is configured to provide the PCC rules or the QoS rules to the FMC PF; or the ePDG may be configured to provide the QoS request to the FMC PF.

The FMC PF may be integrated in a PCRF, the PCRF may be configured to make PCC rules or QoS rules when the user is a non-roaming user, and to acquire the PCC rules or the QoS rules from a PCRF of the PLMN to which the user belongs when the user is a roaming user; or the PCRF may be configured to acquire the QoS request from the ePDG.

When the FMC PF receives a rejection message from the BPCF, the FMC PF may be configured to perform resource pre-emption according to an ARP.

From the above technical scheme provided by the disclosure, it can be seen that an FMC PF used for sensing the access of a UE to a fixed broadband access network is set in a mobile network which a user requests to be accessed to; after the FMC PF receives a trigger message from an ePDG, the FMC PF requests a BPCF to establish a policy session, and the BPCF performs policy control according to the information of the fixed broadband access network accessed by the UE. From the implementation of the method of the disclosure, it can be seen that when the UE is accessed to the 3GPP through the fixed broadband access network, the FMC PF senses a gateway control session establishment request message or a DHCP request message from the ePDG, so that the PCRF of the 3GPP access network accessed by the UE is triggered to send a policy session request to the BPCF. In this way, in the case that the fixed broadband access network fails to sense the access of the UE or that the fixed broadband access network does not support 3GPP-based access authentication in the conventional art where the UE is accessed to a 3GPP core network through the fixed broadband access network, QoS control is achieved for the access of the UE, and thus QoS guarantee is provided to the entire transmission path of data.

DETAILED DESCRIPTION

Figure 1:
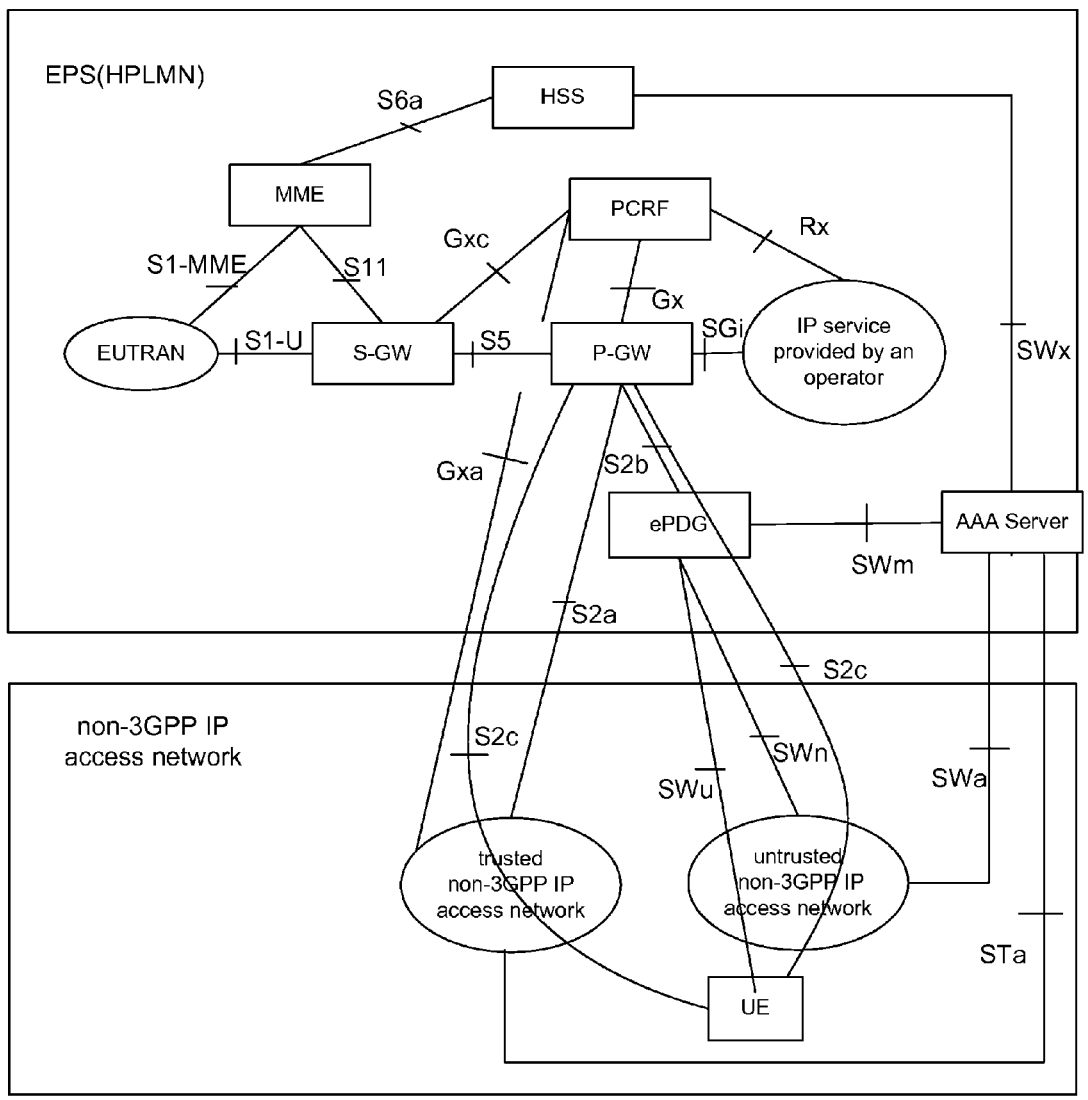
FIG. 1 shows an architecture diagram of an existing EPS.
Figure 2:
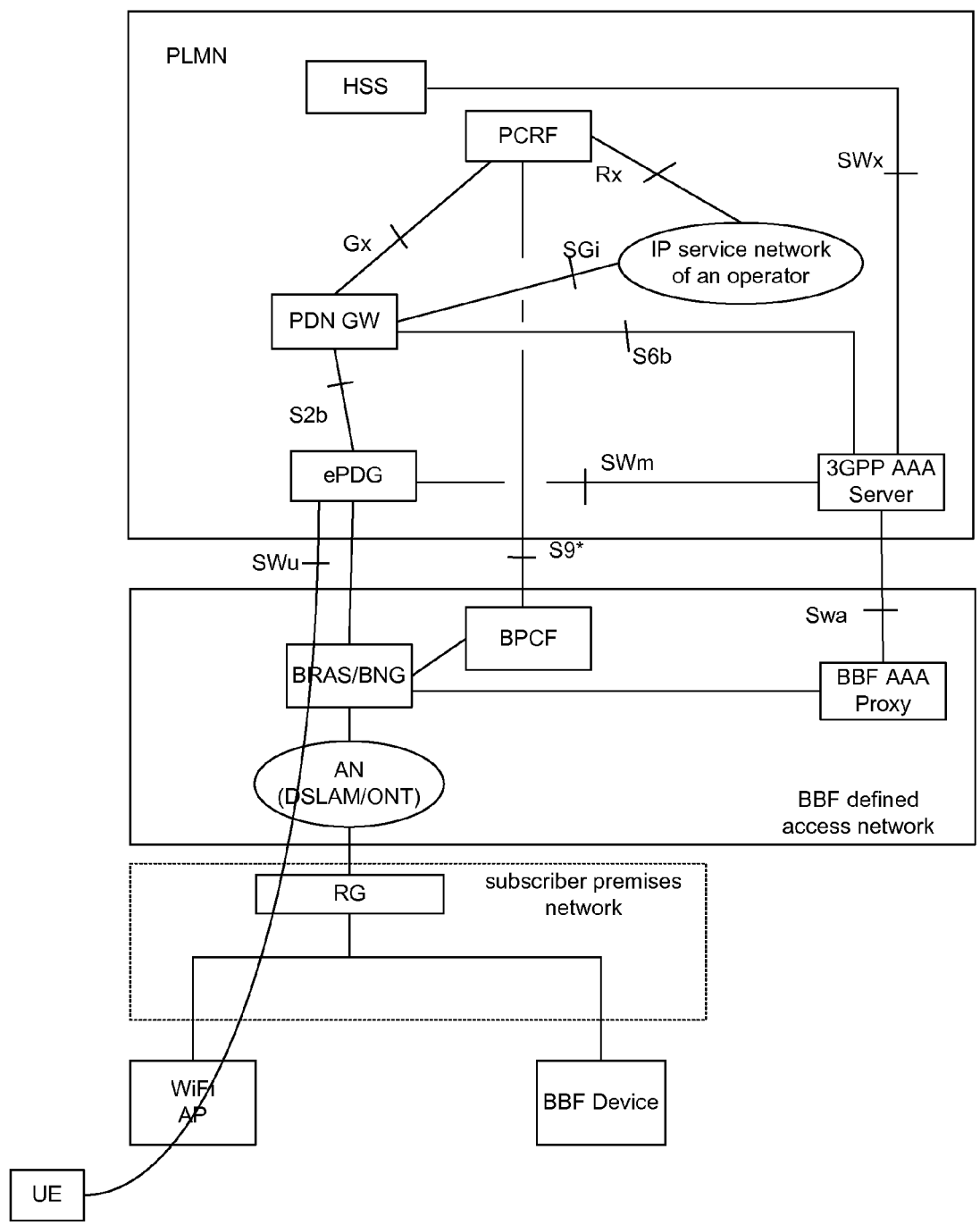
FIG. 2 shows a diagram illustrating the architecture in which a UE accesses a 3GPP core network through a fixed broadband access network according to the conventional art.
Figure 3:
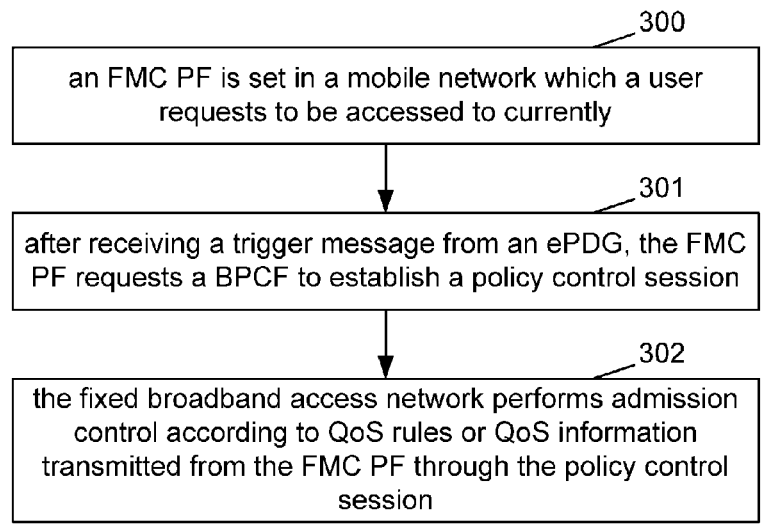
FIG. 3 shows a flowchart of a policy control method for accessing a fixed broadband access network according to the disclosure.

FIG. 3 shows a flowchart of a policy control method for accessing a fixed broadband access network according to the disclosure. As shown in FIG. 3, the method includes the following steps.

Step 300: an FMC Policy Function (PF) is set in a mobile network which a user requests to be accessed to.

The FMC PF may serve as a separate function entity, or may be integrated in a PCRF.

When the user is a non-roaming user, the mobile network which the user requests to be accessed to is the PLMN to which the user belongs; when the user is a roaming user, the mobile network which the user requests to be accessed to is the PLMN that the user visits.

Step 301: after receiving a trigger message from an ePDG, the FMC PF requests a BPCF to establish a policy control session.

After a UE is accessed to a fixed broadband access network system, the fixed broadband access network system would allocate a local IP address for the UE, then the UE initiates an Internet Key Exchange version 2 (IKEv2) tunnel establishment process and adopts an Extensible Authentication Protocol (EAP) to perform authentication. For a roaming scene, the ePDG further interacts with an Authentication, Authorization and Accounting Server (AAA Server, which also can interact with an HSS) through an AAA Proxy to complete the EAP authentication.

After the EAP authentication is passed, the ePDG sends the FMC PF a gateway control session establishment message or a DHCP request message to, in which user ID, PDN ID and IPSec external tunnel information are carried. The IPSec external tunnel information includes the source address and the source port of the IKEv2 signalling sent from the UE and received by the ePDG. It should be noted that the source address and the source port received by the ePDG probably are different from those sent by the UE because the IKEv2 signalling might be processed with Network Address Translator (NAT) traversal. For ease of description, the source address of the UE acquired by the ePDG in this paper (including both conditions of NAT existing between the UE and the ePDG and NAT not existing between the UE and the ePDG) is called the UE local IP address. For the condition of NAT not existing between the UE and the ePDG, the UE local IP address may be applied to the fixed broadband access network to locate the UE; if NAT exists, the local address of the UE and the source port number may be applied to the fixed broadband access network to locate the UE. If there is no NAT detected, the IPSec external tunnel information contains the source IP address only.

The FMC PF determines the BPCF of the fixed broadband access network accessed by the UE or the entry point of the fixed broadband access network in which the BPCF is located according to the source address (for example, IP address) in the IPSec external tunnel information, and sends an S9* session establishment message to the BPCF, wherein the S9* session establishment message is carried with the source IP address and the source port number contained in the IPSec external tunnel information (NAT exists if NAT is detected).

Step 302: the fixed broadband access network performs admission control according to QoS rules or QoS information transmitted from the FMC PF through the policy control session.

The fixed broadband access network performs admission control according to the QoS rules or QoS information and the available bandwidth resource of the line of the fixed broadband access network accessed by the user, or delegates other network elements of the fixed broadband access network to perform resource admission control.

It can be seen from the implementation of the method of the disclosure that, when the UE is accessed to the 3GPP through the fixed broadband access network, the FMC PF senses the trigger message from the ePDG (receiving the gateway control session establishment request message or DHCP request message), so that the FMC PF of the 3GPP access network accessed by the UE is triggered to send a policy session request to the BPCF. In this way, in the case that the fixed broadband access network fails to sense the access of the UE or that the fixed broadband access network does not support 3GPP-based access authentication in the architecture of the conventional art where the UE is accessed to the 3GPP core network through the fixed broadband access network, QoS control is achieved for the access of the UE, and thus QoS guarantee is provided to the entire transmission path of data.

After the UE is accessed to the 3GPP core network through the fixed broadband access network, the policy may change. For instance, the PCRF (or a Home PCRF (H-PCRF) in a roaming scene) makes a policy after receiving service information provided by an AF or a resource modification request message initiated by the UE, and the BPCF is requested to perform admission control after the FMC PF receives changed PCC rules, QoS Rules or QoS request, then the fixed broadband access network performs resource admission control according to the request (that is, the BPCF performs resource admission control or the BPCF delegates other network elements to perform resource admission control).

Figure 4:
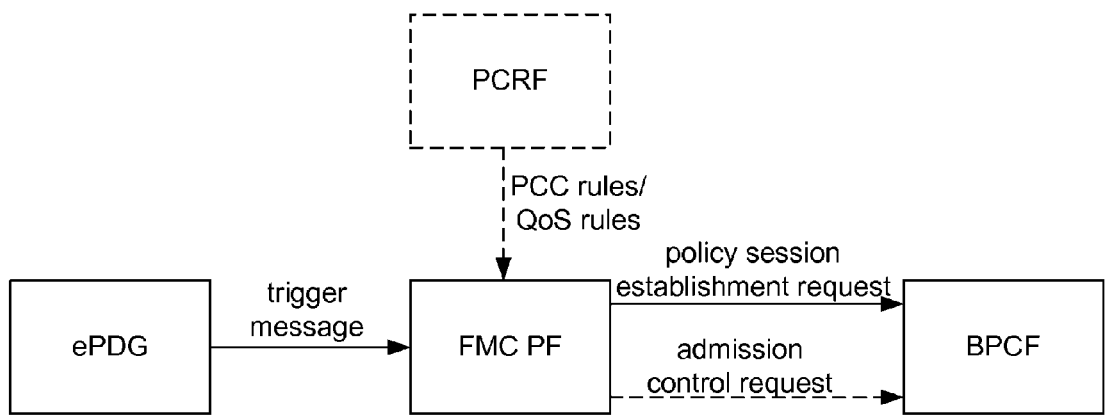
FIG. 4 shows a structure diagram of a policy control system for accessing a fixed broadband access network according to the disclosure.

FIG. 4 shows a structure diagram of a policy control system for accessing a fixed broadband access network according to the disclosure. As shown in FIG. 4, the system at least includes an ePDG, an FMC PF and a BPCF, wherein the ePDG is configured to send a trigger message to the FMC PF;

the FMC PF, provided in a mobile network which a user requests to be accessed to, is configured to receive the trigger message from the ePDG and to request the BPCF to establish a policy control session; wherein the FMC PF may serve as a separate function entity, or may be integrated in a PCRF;

the BPCF is configured to receive the request from the FMC PF and to perform admission control according to QoS rules or QoS information transmitted through the policy control session or to delegate other network elements of the fixed broadband access network to perform admission control.

The FMC PF is specifically configured to acquire PCC rules, QoS rules or a QoS request containing GBR, and to transmit the QoS information to the BPCF through the policy control session.

When the FMC PF serves as a separate function entity, the system provided by the disclosure further includes a PCRF which is configured to provide the PCC rules or QoS rules to the FMC PF; or the ePDG is further configured to provide the QoS request to the FMC PF.

When the FMC PF is integrated in the PCRF, the PCRF is configured to make the PCC rules or QoS rules when the user is a non-roaming user, and to acquire the PCC rules or QoS rules from the PCRF of the PLMN to which the user belongs when the user is a roaming user; or the PCRF is configured to acquire the QoS request from the ePDG.

The method of the disclosure is described below in further detail in conjunction with embodiments.

Figure 5:
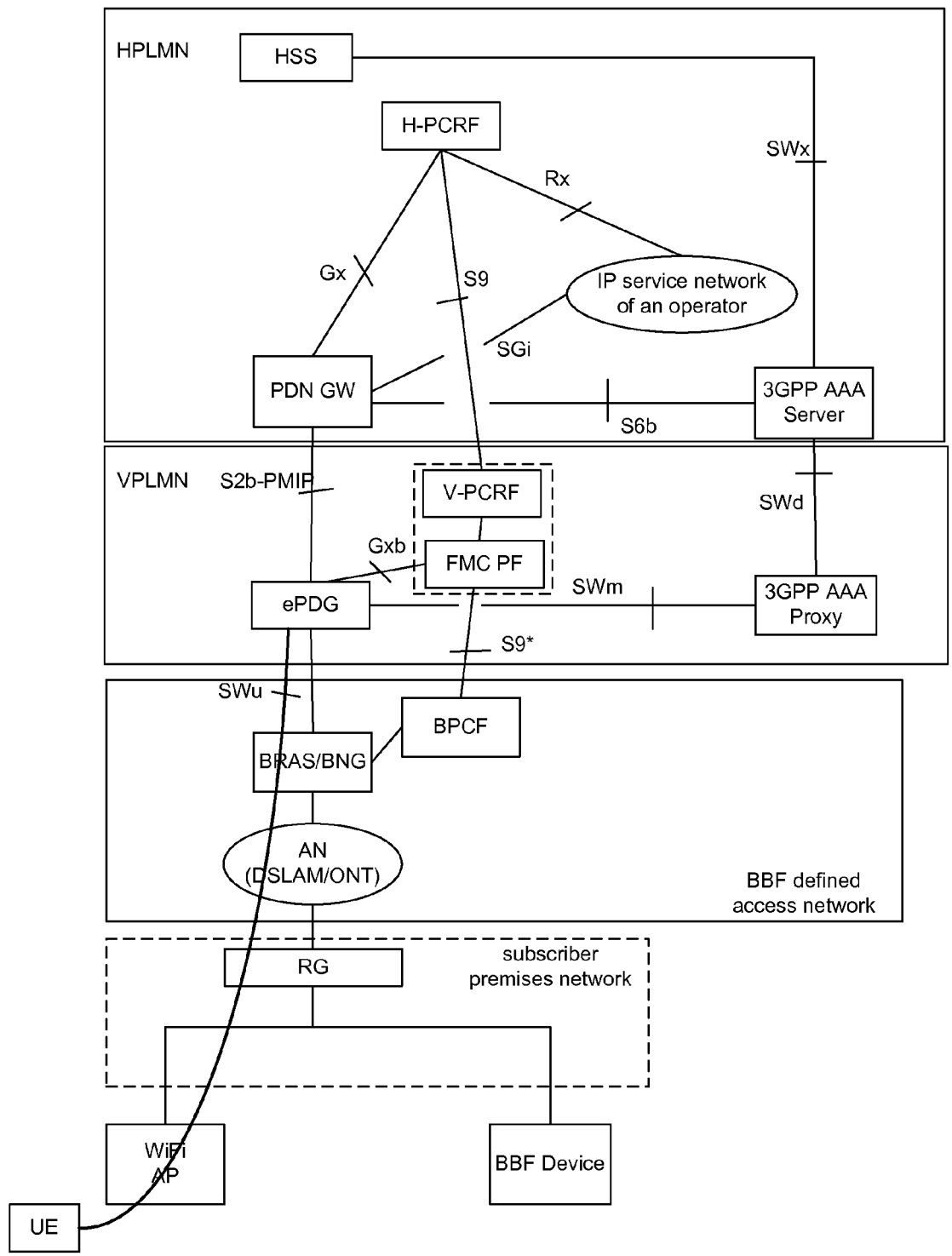
FIG. 5 shows a diagram illustrating the home routed roaming scene in which a UE is accessed to a 3GPP core network through an untrusted fixed broadband access network according to the disclosure, in which a PMIPv6 protocol is adopted between an ePDG and a P-GW.

FIG. 5 shows a diagram illustrating the home routed roaming scene in which a UE is accessed to a 3GPP core network through an untrusted fixed broadband access network according to the disclosure, in which a PMIPv6 protocol is adopted between an ePDG and a P-GW. In FIG. 5, except the addition of the FMC PF, other network entities and the connection relationships therebetween are the same as those in the conventional art. Therefore, FIG. 5 is easily understood for those skilled in the art and no further description is provided here.

Figure 6:
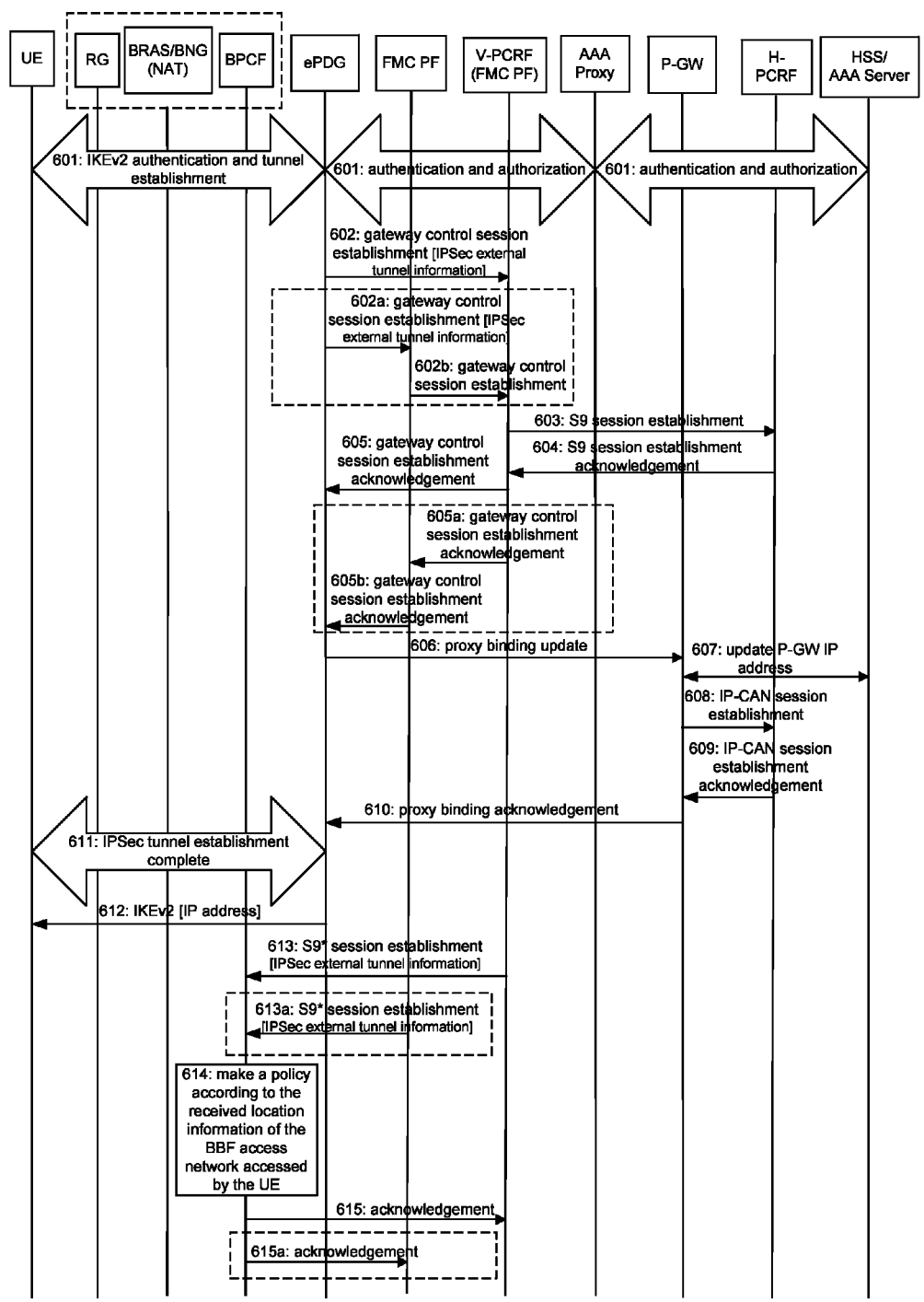
FIG. 6 shows an attachment flowchart in which a UE is accessed to a 3GPP core network through an untrusted fixed broadband access network based on the architecture shown in FIG. 5.

FIG. 6 shows an attachment flowchart in which a UE is accessed to a 3GPP core network through an untrusted fixed broadband access network based on the architecture shown in FIG. 5. Referring to FIG. 5 and FIG. 6, supposing an FMC PF is provided in a V-PCRF as the function enhancement of the V-PCRF in this embodiment, the specific implementation includes the following steps.

Step 601: after the UE is accessed to the fixed broadband access network system, the fixed broadband access network system allocates a local IP address for the UE. The UE initiates an IKEv2 tunnel establishment process and adopts an EAP to perform authentication. Since this embodiment is in a roaming scene, the ePDG interacts with an AAA Server (the AAA Server further interacts with an HSS) through an AAA Proxy to complete the EAP authentication.

Step 602: the ePDG sends the V-PCRF a gateway control session establishment message, in which the user ID, PDN ID and IPSec external tunnel information are carried, wherein the IPSec external tunnel information includes the source address and the source port of the IKEv2 signalling sent from the UE and received by the ePDG.

Since the IKEv2 signalling might be processed with NAT traversal, the source address and the source port received by the ePDG probably are different from those sent by the UE. For ease of description, the source address of the UE acquired by the ePDG (including both conditions of NAT existing between the UE and the ePDG and NAT not existing between the UE and the ePDG) is called the UE local IP address. For the condition of NAT not existing between the UE and the ePDG, the UE local IP address may be applied to the fixed broadband access network to locate the UE; if NAT exists, the local address of the UE and the source port number may be applied to the fixed broadband access network to locate the UE. If there is no NAT detected, the IPSec external tunnel information contains the source IP address only.

It should be noted that Step 602 includes Step 602a and Step 602b if the FMC PF serves as a separate network element entity.

Step 602a: the ePDG sends the FMC PF the gateway control session establishment message, in which the user ID, the PDN ID and the IPSec external tunnel information are carried.

Step 602b: the FMC PF sends the V-PCRF the gateway control session establishment message, in which the user ID and the PDN ID are carried.

Step 603: the V-PCRF sends the H-PCRF an S9 session establishment message (or the gateway control session establishment message), in which the user ID and the PDN ID are carried.

Step 604: the H-PCRF interacts with an SPR according to the user ID and the PDN ID so as to acquire user subscription data, and makes a PCC policy according to a network policy. The PCC policy includes PCC rules, QoS rules, event triggers and so on. The H-PCRF carries the QoS rules and the event triggers in an S9 session establishment acknowledgement message which is sent to the V-PCRF.

Step 605: the V-PCRF sends the ePDG a gateway control session establishment acknowledgement message, in which the QoS rules and the event triggers are carried.

It should be noted that Step 605 includes Step 605a and Step 605b if the FMC PF serves as a separate network element entity.

Step 605a: the V-PCRF sends the FMC PF the gateway control session establishment acknowledgement message, in which the QoS rules and the event triggers are carried.

Step 605b: the FMC PF sends the ePDG the gateway control session establishment acknowledgement message, in which the QoS rules and the event triggers are carried.

Step 606: after the ePDG selects a P-GW, the ePDG sends the P-GW a proxy binding update message, in which the user ID and the PDN ID are carried.

Step 607: the P-GW sends a P-GW IP address update message to the AAA Server and sends the address of the P-GW itself to the AAA Server; then the AAA Server interacts with the HSS and saves the address of the P-GW in the HSS.

Step 608: the P-GW allocates an IP address for the UE, and sends the H-PCRF an IP-Connectivity Access Network (IP-CAN) session establishment indication message in which the user ID, the PDN ID and the IP address allocated for the UE are carried.

is Step 609: the H-PCRF associates the S9 session established in Step 603 with the IP-CAN session requested in Step 609 according to the user ID and the PDN ID. The H-PCRF might update the PCC rules and QoS rules made in Step 604. The H-PCRF returns an acknowledgement message carrying the PCC rules to a PCEF.

Step 610: the P-GW returns to the ePDG a proxy binding acknowledgement message, in which the IP address allocated for the UE is allocated.

Step 611: the proxy binding is updated successfully, and an IPSec tunnel is established between the UE and the ePDG.

Step 612: the ePDG sends the UE the last IKEv2 signalling in which the IP address of the UE is carried.

Step 613: the V-PCRF determines the BPCF of the fixed broadband access network accessed by the UE or the entry point of the fixed broadband access network in which the BPCF is located according to the source IP address in the IPSec external tunnel information, and sends the BPCF an S9* session establishment message in which the source IP address and the source port number (if NAT is detected) contained in the IPSec external tunnel information and the QoS rules are carried.

It should be noted that Step 613 refers to Step 613a if the FMC PF serves as a separate network element entity.

Step 613a: the FMC PF determines the BPCF of the fixed broadband access network accessed by the UE or the entry point of the fixed broadband access network in which the BPCF is located according to the source IP address in the IPSec external tunnel information, and sends the BPCF the S9* session establishment message in which the source IP address and the source port number (if NAT is detected) contained in the IPSec external tunnel information and the QoS rules are carried.

The execution of this step is triggered after the FMC PF receives the gateway control session establishment message from the ePDG (Step 602). Through this step, the FMC PF senses the access of the UE, triggers the PCRF of the 3GPP access network accessed by the UE to send a policy session request to the BPCF. In this way, QoS control is achieved for the access of the UE, and thus QoS guarantee is provided to the entire transmission path of data.

When the fixed broadband access network does not support 3GPP-based access authentication, through this step, QoS control is also achieved for the access of the UE, and thus QoS guarantee is provided to the entire transmission path of data.

Step 614: the BPCF performs the admission control according to the QoS rules and the access location information of the fixed broadband access network accessed by the UE, or delegates other network elements of the fixed broadband access network to perform resource admission control (that is, the fixed broadband access network performs the admission control).

Step 615: the BPCF returns an acknowledgement message to the V-PCRF.

It should be noted that Step 615 refers to Step 615a if the FMC PF serves as a separate network element entity.

Step 615a: the BPCF returns an acknowledgement message to the FMC PF.

In other embodiments, the ePDG sends a DHCP request message to the V-PCRF in Step 602, wherein the message is carried with the user ID, the PDN ID and the IPSec external tunnel information. In Step 602a, the ePDG sends the DHCP request message to the FMC PF, wherein the message is carried with the user ID, the PDN ID and the IPSec external tunnel information. In Step 602b, the FMC PF sends the DHCP request message to the V-PCRF, wherein the message is carried with the user ID and the PDN ID.

Correspondingly, in Step 605, the V-PCRF sends a DHCP acknowledgement message to the ePDG, wherein this message is carried with the QoS rules and the event triggers. In Step 605a, the V-PCRF sends the DHCP acknowledgement message to the FMC PF, wherein this message is carried with the QoS rules and the event triggers. In step 605b, the FMC PF sends the DHCP acknowledgement message to the ePDG, wherein this message is carried with the QoS rules and the event triggers.

To sum up, the disclosure is not limited to the messages and protocol types interacted between the ePDG and the V-PCRF or between the ePDG and the FMC PF or between the FMC PF and the V-PCRF.

Figure 7:
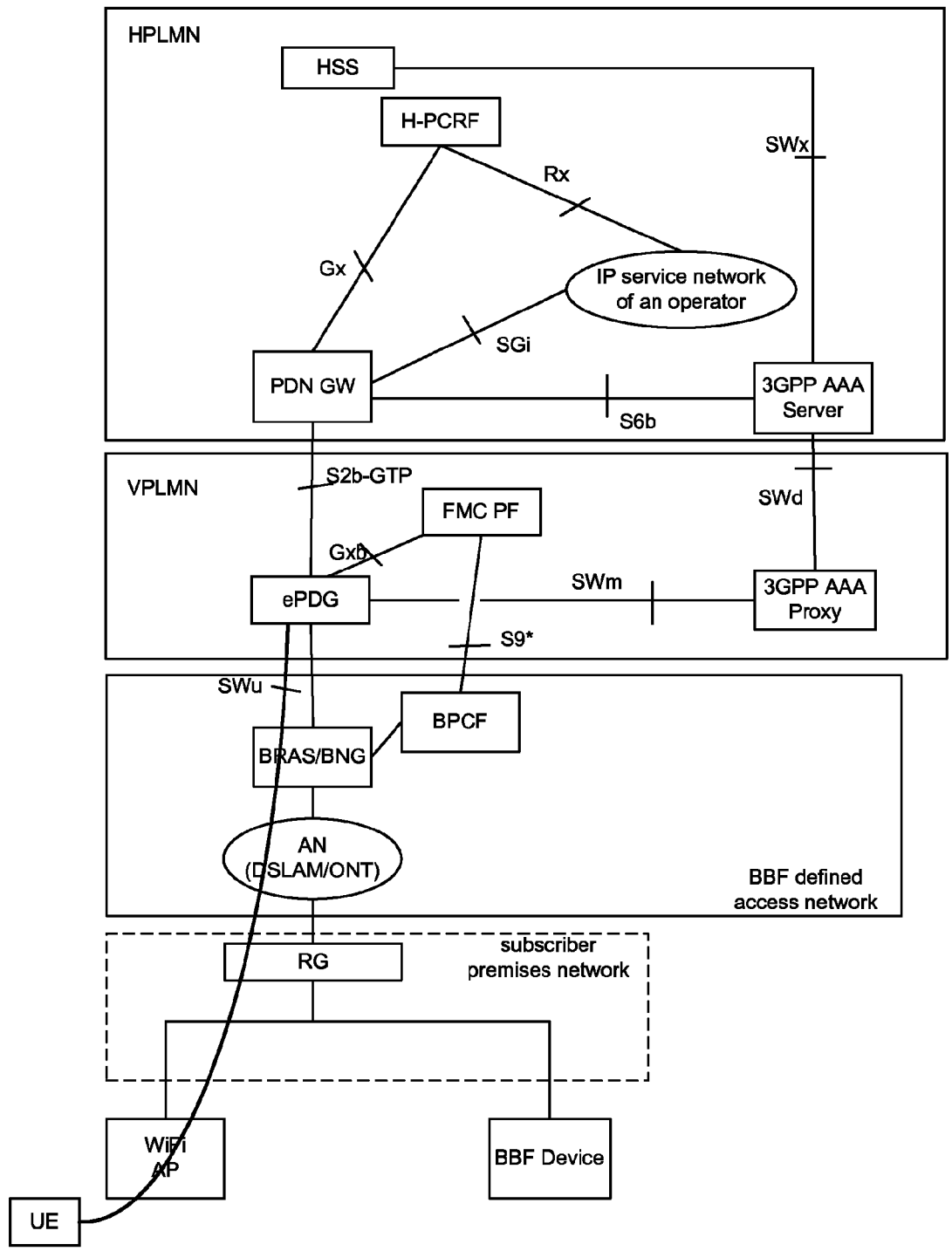
FIG. 7 shows a diagram illustrating the home routed roaming scene in which a UE is accessed to a 3GPP core network through an untrusted fixed broadband access network according to the disclosure, in which a GTP protocol is adopted between an ePDG and a P-GW.

FIG. 7 shows a diagram illustrating the home routed roaming scene in which a UE is accessed to a 3GPP core network through an untrusted fixed broadband access network according to the disclosure, in which a GTP protocol is adopted between an ePDG and a P-GW. In FIG. 7, except the addition of the FMC PF, other network entities and the connection relationships therebetween are the same as those in the conventional art. Therefore, FIG. 7 is easily understood for those skilled in the art and no further description is provided here.

Figure 8:
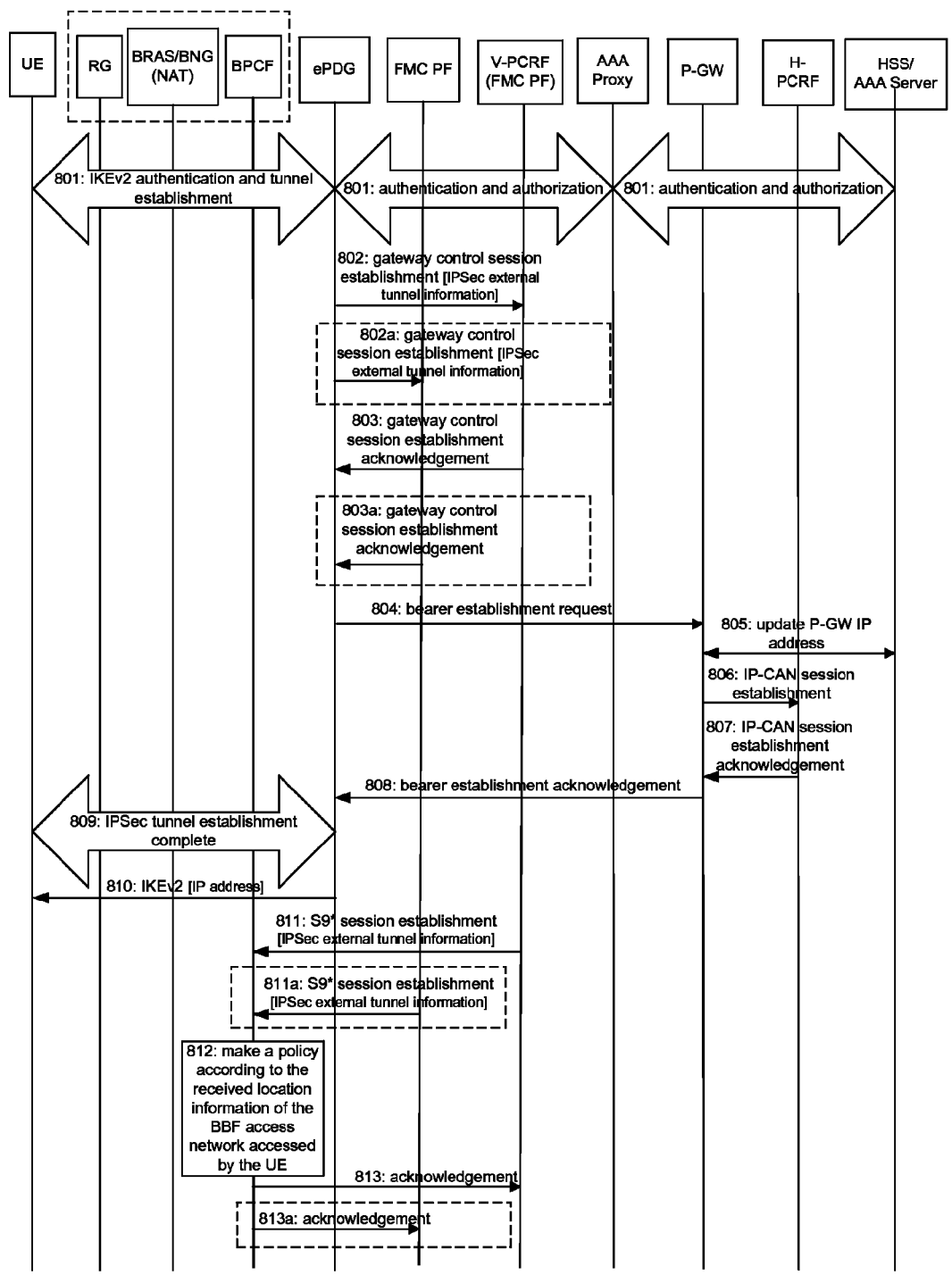
FIG. 8 shows an attachment flowchart in which a UE is accessed to a 3GPP core network through an untrusted fixed broadband access network based on the architecture shown in FIG. 7.

FIG. 8 shows an attachment flowchart in which a UE is accessed to a 3GPP core network through an untrusted fixed broadband access network based on the architecture shown in FIG. 7. Referring to FIG. 7 and FIG. 8, supposing an FMC PF is provided in a V-PCRF as the function enhancement of the V-PCRF in this embodiment, the specific implementation includes the following steps.

Step 801: after the UE is accessed to the fixed broadband access network system, the fixed broadband access network system allocates a local IP address for the UE. The UE initiates an IKEv2 tunnel establishment process and adopts an EAP to perform authentication. Since this embodiment is in a roaming scene, the ePDG interacts with an AAA Server (the AAA Server further interacts with an HSS) through an AAA Proxy to complete the EAP authentication.

Step 802: the ePDG sends the V-PCRF a gateway control session establishment message, in which the user ID, PDN ID and IPSec external tunnel information are carried, wherein the IPSec external tunnel information includes the source address and the source port of the IKEv2 signalling sent from the UE and received by the ePDG.

Since the IKEv2 signalling might be processed with NAT traversal, the source address and the source port received by the ePDG probably are different from those sent by the UE. For ease of description, the source address of the UE acquired by the ePDG (including both conditions of NAT existing between the UE and the ePDG and NAT not existing between the UE and the ePDG) is called the UE local IP address. For the condition of NAT not existing between the UE and the ePDG, the UE local IP address may be applied to the fixed broadband access network to locate the UE; if NAT exists, the local address of the UE and the source port number may be applied to the fixed broadband access network to locate the UE. If there is no NAT detected, the IPSec external tunnel information contains the source IP address only.

It should be noted that Step 802 refers to Step 802a if the FMC PF serves as a separate network element entity.

Step 802a: the ePDG sends the FMC PF the gateway control session establishment message, in which the user ID, the PDN ID and the IPSec external tunnel information are carried.

Step 803: the V-PCRF returns a gateway control session establishment acknowledgement message to the ePDG. It should be noted that Step 803 refers to Step 803a if the FMC PF serves as a separate network element entity.

Step 803a: the FMC PF returns the gateway control session establishment acknowledgement message to the ePDG.

Step 804: after the ePDG selects a P-GW, the ePDG sends a bearer establishment request message to the P-GW, wherein the user ID and the PDN ID are carried.

Step 805: the P-GW sends a P-GW IP address update message to the AAA Server and sends the address of the P-GW itself to the AAA Server; then the AAA Server interacts with the HSS and saves the address of the P-GW in the HSS.

Step 806: the P-GW allocates an IP address for the UE, and sends the H-PCRF an IP-CAN session establishment indication message in which the user ID, the PDN ID and the IP address allocated for the UE are carried.

Step 807: the H-PCRF interacts with an SPR according to the user ID and the PDN ID, acquires the subscription information of the user and makes a PCC policy. The PCC policy includes PCC rules, event triggers and so on. The PCRF returns an acknowledgement message carrying the PCC rules and the event triggers to a PCEF.

Step 808: the P-GW returns a bearer establishment acknowledgement message to the ePDG, wherein bearer establishment acknowledgement message is carried with the IP address allocated for the UE.

Step 809: the bearer is established successfully, and an IPSec tunnel is established between the UE and the ePDG.

Step 810: the ePDG sends the UE the last IKEv2 signalling in which the IP address of the UE is carried.

Step 811: the V-PCRF determines the BPCF of the fixed broadband access network accessed by the UE c or the entry point of the fixed broadband access network in which the BPCF is located according to the source IP address in the IPSec external tunnel information, and sends the BPCF an S9* session establishment message in which the source IP address and the source port number (if NAT is detected) contained in the IPSec external tunnel information and the QoS rules are carried.

It should be noted that Step 811 refers to Step 811a if the FMC PF serves as a separate network element entity.

Step 811a: the FMC PF determines the BPCF of the fixed broadband access network accessed by the UE or the entry point of the fixed broadband access network in which the BPCF is located according to the source IP address in the IPSec external tunnel information, and sends the BPCF the S9* session establishment message in which the source IP address and the source port number (if NAT is detected) contained in the IPSec external tunnel information and the QoS rules are carried.

The execution of this step is triggered after the FMC PF receives the gateway control session establishment message from the ePDG (Step 802). Through this step, the FMC PF senses the access of the UE, triggers the PCRF of the 3GPP access network accessed by the UE to send a policy session request to the BPCF. In this way, QoS control is achieved for the access of the UE, and thus QoS guarantee is provided to the entire transmission path of data.

When the fixed broadband access network does not support 3GPP-based access authentication, through this step, QoS control is also achieved for the access of the UE, and thus QoS guarantee is provided to the entire transmission path of data.

Step 812: the BPCF performs the resource admission control according to the QoS rules (or the QoS information in the QoS rules) and the access location information of the fixed broadband access network accessed by the UE, or delegates other network elements of the fixed broadband access network to perform the resource admission control (that is, the fixed broadband access network performs the admission control).

Step 813: the BPCF returns an acknowledgement message to the V-PCRF.

It should be noted that Step 813 refers to Step 813a if the FMC PF serves as a separate network element entity.

Step 813a: the BPCF returns the acknowledgement message to the FMC PF.

In other embodiments, the ePDG sends a DHCP request message to the V-PCRF in Step 802, wherein the message is carried with the user ID, the PDN ID and the IPSec external tunnel information. In Step 802a, the ePDG sends the DHCP request message to the FMC PF, wherein the message is carried with the user ID, the PDN ID and the IPSec external tunnel information.

Correspondingly, in Step 803, the V-PCRF sends a DHCP acknowledgement message to the ePDG. In Step 803a, the FMC PF sends the DHCP acknowledgement message to the ePDG.

Figure 9:
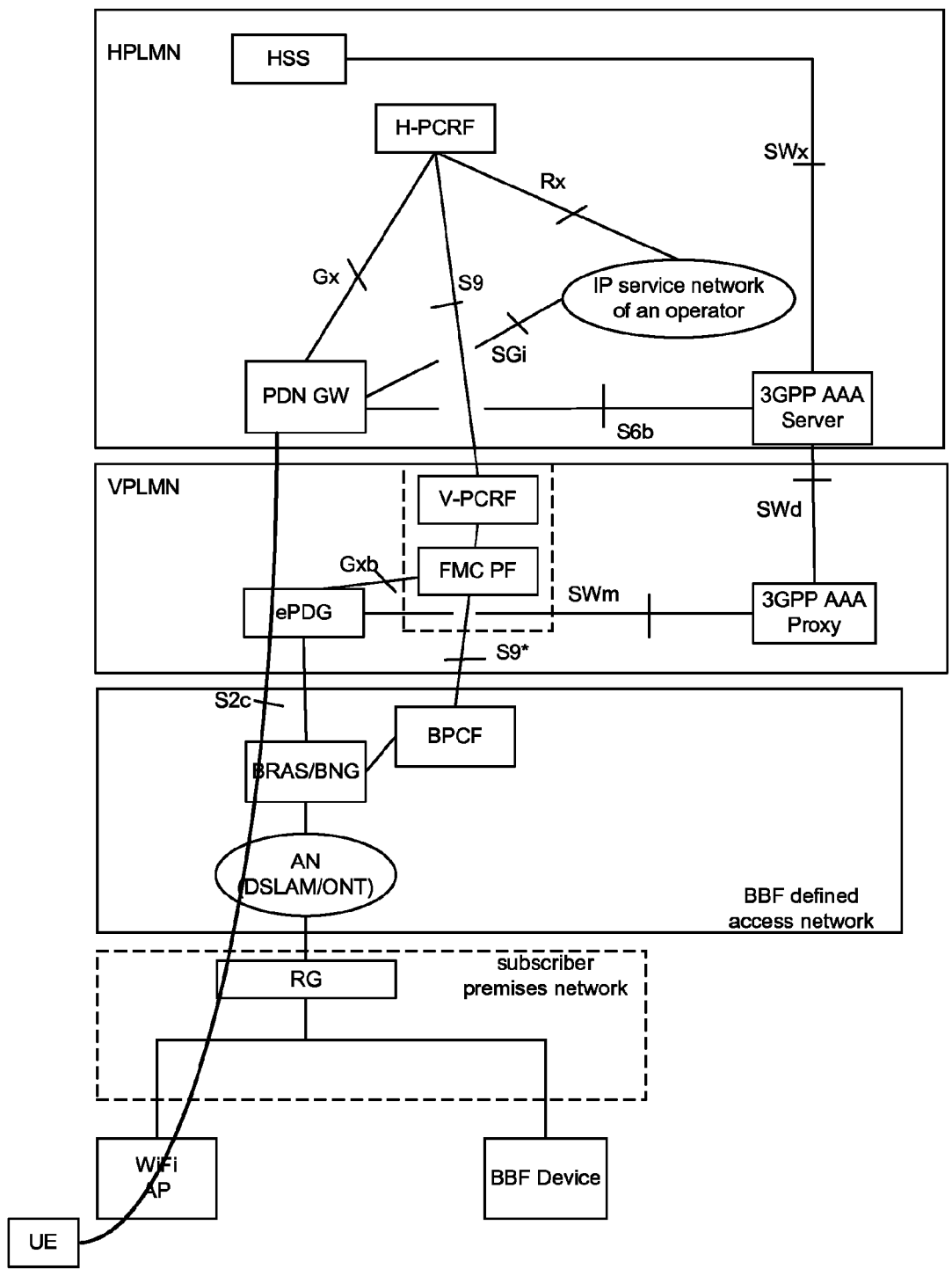
FIG. 9 shows a diagram illustrating the home routed roaming scene in which a UE is accessed to a 3GPP core network through an untrusted fixed broadband access network according to the disclosure, in which the UE adopts a DSMI Pv6 protocol.

FIG. 9 shows a diagram illustrating the home routed roaming scene in which a UE is accessed to a 3GPP core network through an untrusted fixed broadband access network according to the disclosure, in which the UE adopts a DSMIPv6 protocol. In FIG. 9, except the addition of the FMC PF, other network entities and the connection relationships therebetween are the same as those in the conventional art. Therefore, FIG. 9 is easily understood for those skilled in the art and no further description is provided here.

Figure 10:
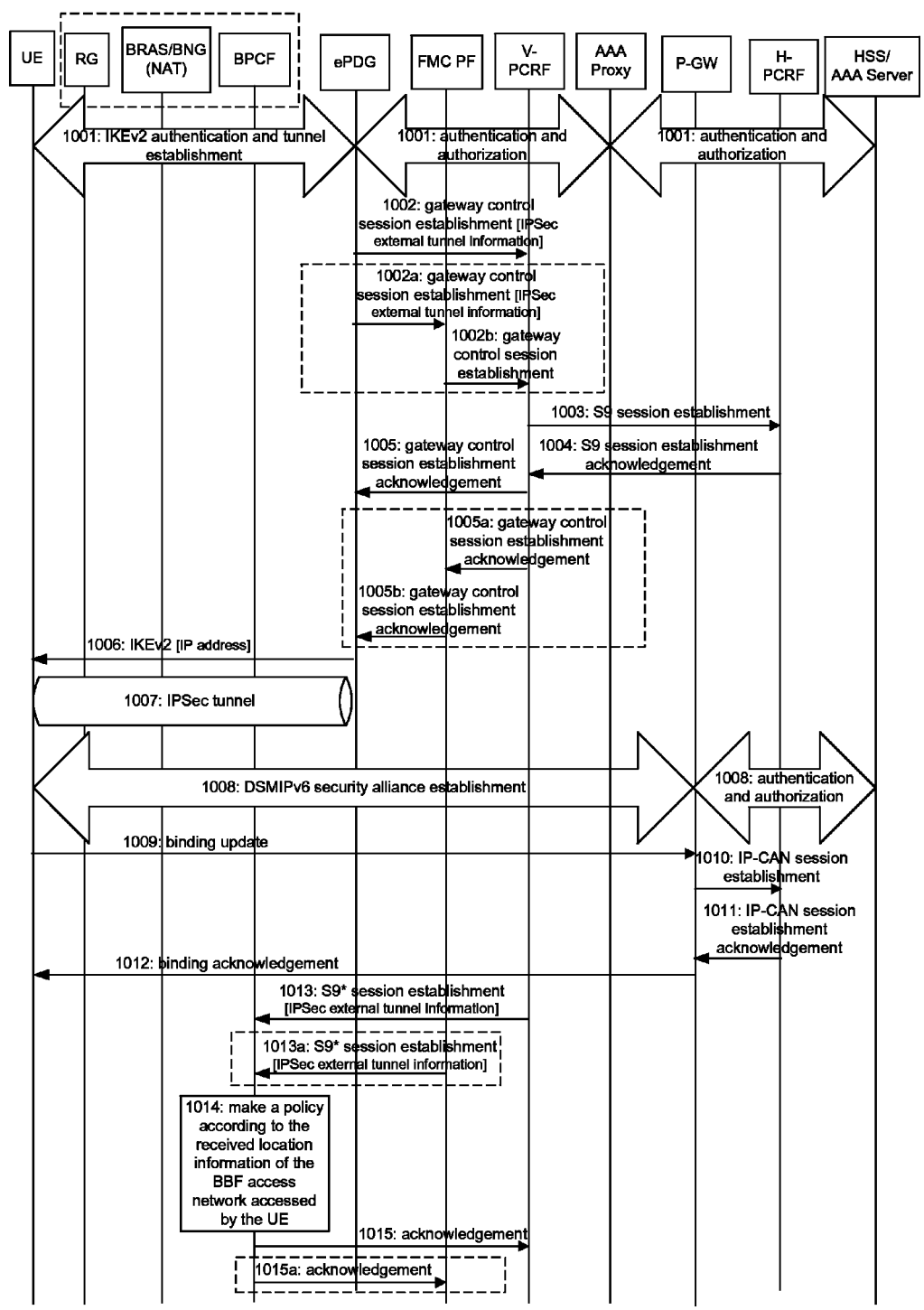
FIG. 10 shows an attachment flowchart in which a UE is accessed to a 3GPP core network through an untrusted fixed broadband access network based on the architecture shown in FIG. 9.

FIG. 10 shows an attachment flowchart in which a UE is accessed to a 3GPP core network through an untrusted fixed broadband access network based on the architecture shown in FIG. 9. Referring to FIG. 9 and FIG. 10, supposing an FMC PF is provided in a V-PCRF as the function enhancement of the V-PCRF in this embodiment, the specific implementation includes the following steps.

Step 1001: after the UE is accessed to the fixed broadband access network system, the fixed broadband access network system allocates a local IP address for the UE. The UE initiates an IKEv2 tunnel establishment process and adopts an EAP to perform authentication. Since this embodiment is in a roaming scene, the ePDG interacts with an AAA Server (the AAA Server further interacts with an HSS) through an AAA Proxy to complete the EAP authentication.

Step 1002: the ePDG sends V-PCRF a gateway control session establishment message, in which the user ID, PDN ID and IPSec external tunnel information are carried, wherein the IPSec external tunnel information includes the source address and the source port of the IKEv2 signalling sent from the UE and received by the ePDG.

Since the IKEv2 signalling might be processed with NAT traversal, the source address and the source port received by the ePDG probably are different from those sent by the UE. For ease of description, the source address of the UE acquired by the ePDG (including both conditions of NAT existing between the UE and the ePDG and NAT not existing between the UE and the ePDG) is called the UE local IP address. For the condition of NAT not existing between the UE and the ePDG, the UE local IP address may be applied to the fixed broadband access network to locate the UE; if NAT exists, the local address of the UE and the source port number may be applied to the fixed broadband access network to locate the UE. If there is no NAT detected, the IPSec external tunnel information contains the source IP address only.

It should be noted that Step 1002 includes Step 1002*a* and Step 1002*b* if the FMC PF serves as a separate network element entity.

is Step 1002*a*: the ePDG sends the FMC PF the gateway control session establishment message, in which the user ID, the PDN ID and the IPSec external tunnel information are carried.

Step 1002*b*: the FMC PF sends the V-PCRF the gateway control session establishment message, in which the user ID and the PDN ID are carried.

Step 1003: the V-PCRF sends the H-PCRF an S9 session establishment message (or the gateway control session establishment message), in which the user ID and the PDN ID are carried.

Step 1004: the H-PCRF interacts with an SPR according to the user ID and the PDN ID so as to acquire user subscription data, and makes a PCC policy according to a network policy, wherein the PCC policy includes PCC rules, QoS rules, event triggers and so on. The H-PCRF returns an S9 session establishment acknowledgement message carrying the QoS rules and the event triggers to the V-PCRF.

Step 1005: the V-PCRF sends the ePDG a gateway control session establishment acknowledgement message, wherein the QoS rules and the event triggers are carried.

It should be noted that Step 1005 includes Step 1005*a* and Step 1005*b* if the FMC PF serves as a separate network element entity.

Step 1005*a*: the V-PCRF sends the FMC PF the gateway control session establishment acknowledgement message, wherein the QoS rules and the event triggers are carried.

Step 1005*b*: the FMC PF sends the ePDG the gateway control session establishment acknowledgement, wherein the QoS rules and the event triggers are carried.

Step 1006: the ePDG sends the UE the last IKEv2 message in which an IP address allocated for the UE is carried, wherein the IP address serves as the Care-of-Address (CoA) of the UE.

Step 1007: an IPSec tunnel is established between the UE and the ePDG.

Step 1008: the UE performs a bootstrapping process. The UE performs Domain Name Server (DNS) search according to an Access Point Name (APN) so as to acquire the IP address of the P-GW of the PDN to be accessed by the UE. In order to protect the DSMIPv6 message between the UE and the P-GW, the UE establishes a security alliance using the IKEv2 and adopts the EAP to perform authentication. The P-GW communicates with the AAA Server (which further interacts with the HSS) to complete the EAP authentication, meanwhile the P-GW allocates an IPv6 address or a prefix for the UE which serves as the Home of Address (HoA) of the UE.

Step 1009: the UE sends the P-GW a DSMIPv6 binding update message in which the CoA and the HoA are carried, wherein the life cycle parameter in the binding message is not 0. The P-GW establishes a binding context.

Step 1010: a PCEF in the P-GW sends the H-PCRF an IP-CAN session establishment indication message, wherein the user ID and the PDN ID are carried.

Step 1011: the H-PCRF associates the S9 session established in Step 1003 with the IP-CAN session requested to be established in Step 1010 according to the user ID and the PDN ID. The H-PCRF might update the PCC rules and QoS rules made in Step 1004. The H-PCRF returns to the PCEF an acknowledgement message, in which the PCC rules are carried.

Step 1012: the P-GW returns a binding acknowledgement message to the UE.

Step 1013: the V-PCRF determines the BPCF of the fixed broadband access network accessed by the UE or the entry point of the fixed broadband access network in which the BPCF is located according to the source IP address in the IPSec external tunnel information, and sends an S9* session establishment message to the BPCF, wherein the S9* session establishment message is carried with the source IP address and the source port number (if NAT is detected) contained in the IPSec external tunnel information and the QoS rules.

It should be noted that Step 1013 refers to Step 1013*a* if the FMC PF serves as a separate network element entity. Step 1013*a*: the FMC PF determines the BPCF of the fixed broadband access network accessed by the UE or the entry point of the fixed broadband access network in which the BPCF is located according to the source IP address in the IPSec external tunnel information, and sends the S9* session establishment message to the BPCF, wherein the S9* session establishment message is carried with the source IP address and the source port number (if NAT is detected) contained in the IPSec external tunnel information and the QoS rules.

The execution of this step is triggered after the FMC PF receives the gateway control session establishment message from the ePDG (Step 1002). Through this step, the FMC PF senses the access of the UE, triggers the PCRF of the 3GPP access network accessed by the UE to send a policy session request to the BPCF. In this way, QoS control is achieved for the access of the UE, and thus QoS guarantee is provided to the entire transmission path of data.

When the fixed broadband access network does not support 3GPP-based access authentication, QoS control is also achieved for the access of the UE through this step, and thus QoS guarantee is provided to the entire transmission path of data.

Step 1014: the BPCF performs resource admission control according to the QoS rules and the access location information of the fixed broadband access network accessed by the UE, or delegates other network elements of the fixed broadband access network to perform resource admission control (that is, the fixed broadband access network performs the admission control).

Step 1015: the BPCF returns an acknowledgement message to the V-PCRF.

It should be noted that Step 1015 refers to Step 1015*a* if the FMC PF serves as a separate network element entity. Step 1015*a*: the BPCF returns the acknowledgement message to the FMC PF.

In other embodiments, the ePDG sends a DHCP request message to the V-PCRF in Step 1002, wherein the message is carried with the user ID, the PDN ID and the IPSec external tunnel information. In Step 1002*a*, the ePDG sends the DHCP request message to the FMC PF, wherein the message is carried with the user ID, the PDN ID and the IPSec external tunnel information. In Step 1002*b*, the FMC PF sends the DHCP request message to the V-PCRF, wherein the message is carried with the user ID and the PDN ID.

Correspondingly, in Step 1005, the V-PCRF sends a DHCP acknowledgement message to the ePDG, wherein this message is carried with the QoS rules and the event triggers. In Step 1005*a*, the V-PCRF sends the DHCP acknowledgement message to the FMC PF, wherein this message c is carried with the QoS rules and the event triggers. In step 1005*b*, the FMC PF sends the DHCP acknowledgement message to the ePDG, wherein this message is carried with the QoS rules and the event triggers.

Figure 11:
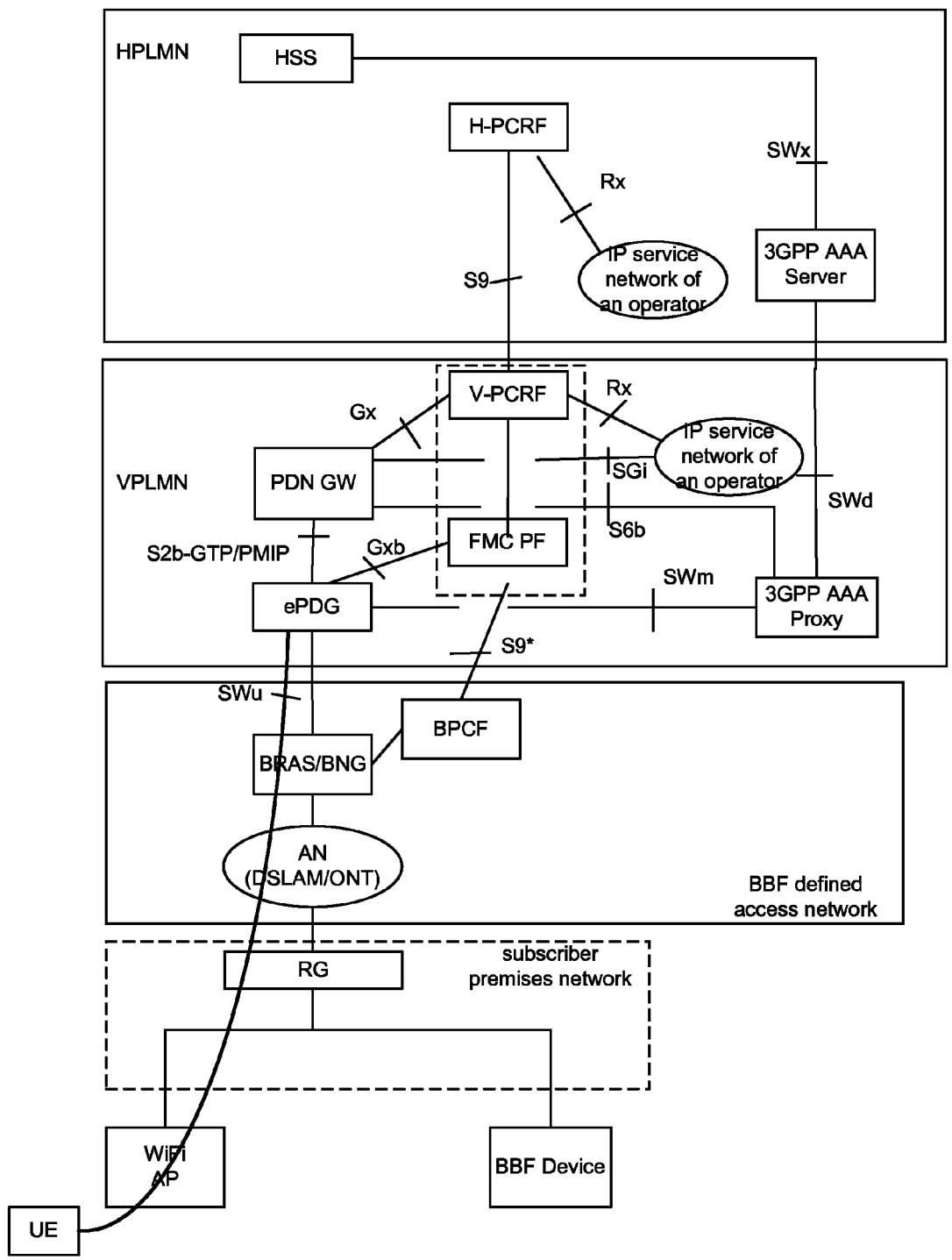
FIG. 11 shows a diagram illustrating the local breakout roaming scene in which a UE is accessed to a 3GPP core network through an untrusted fixed broadband access network according to the disclosure, in which a GTP or PMIPv6 protocol is adopted between an ePDG and a P-GW.

FIG. 11 shows a diagram illustrating the local breakout roaming scene in which a UE is accessed to a 3GPP core network through an untrusted fixed broadband access network according to the disclosure, in which a GTP or PMIPv6 protocol is adopted between an ePDG and a P-GW. In FIG. 11, except the addition of FMC PF, other network entities and the connection relationships therebetween are the same as those in the conventional art. Therefore, FIG. 11 is easily understood for those skilled in the art and no further description is provided here.

Figure 12:
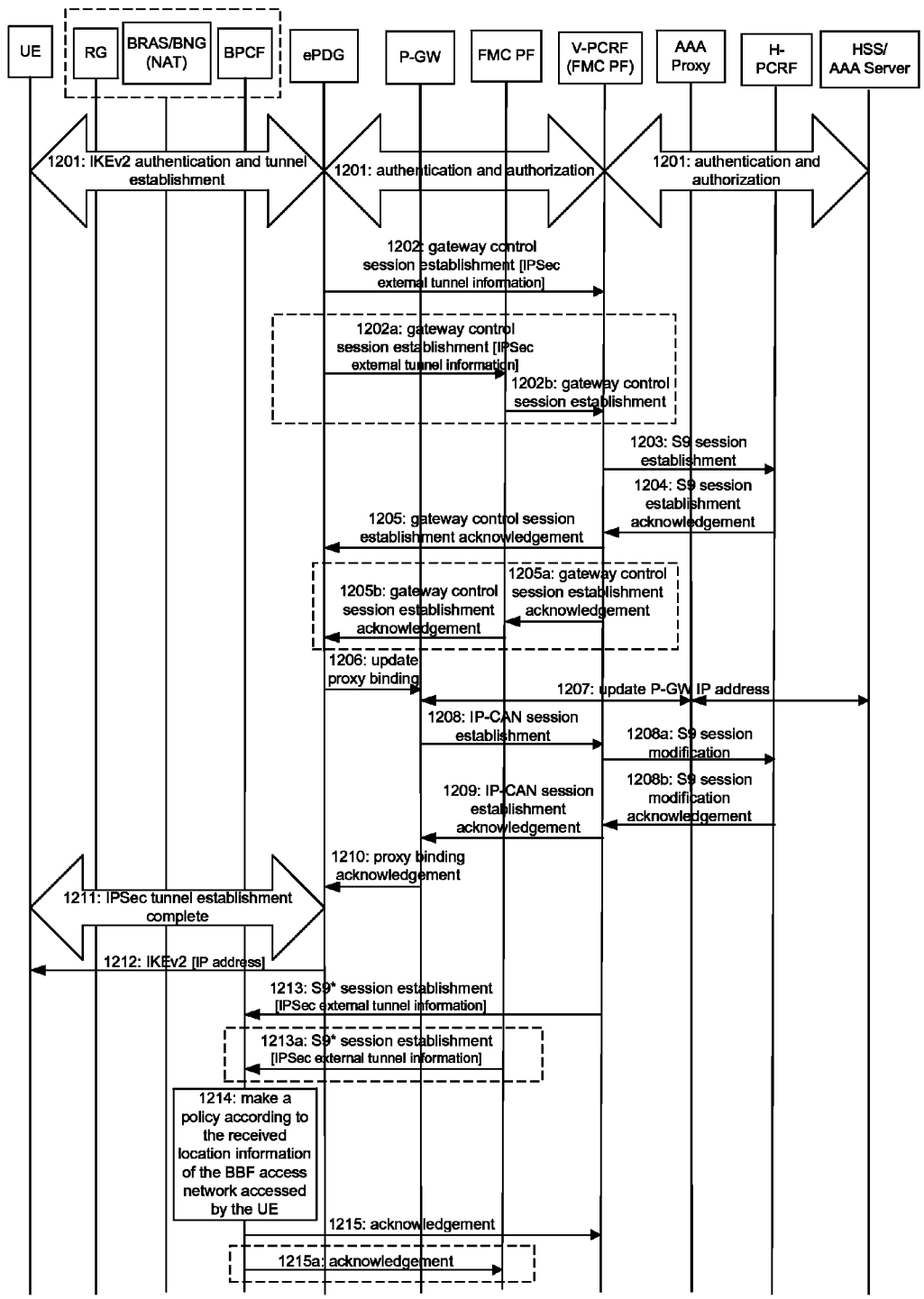
FIG. 12 shows an attachment flowchart in which a UE attachment a 3GPP core network through an untrusted fixed broadband access network based on the architecture shown in FIG. 11.

FIG. 12 shows an attachment flowchart in which a UE is accessed to a 3GPP core network through an untrusted fixed broadband access network based on the architecture shown in FIG. 11. Referring to FIG. 11 and FIG. 12, supposing an FMC PF is provided in a V-PCRF as the function enhancement of the V-PCRF in this embodiment, the specific implementation includes the following steps.

The specific implementation of Step 1201 to Step 1205 is the same as that of Step 601 to Step 605, and no further description is repeated here.

Step 1206: after the ePDG selects the Visited P-GW, the ePDG sends the P-GW a proxy binding update or session establishment request message, in which the user ID and the PDN ID are carried.

Step 1207: the P-GW sends a P-GW IP address update message to the AAA Server through the AAA proxy and sends the address of the P-GW itself to the AAA Server, then the AAA Server interacts with the HSS and saves the address of the P-GW in the HSS.

is Step 1208: the P-GW allocates an IP address for the UE, and sends the V-PCRF an IP-CAN session establishment indication message, wherein the user ID, the PDN ID and the IP address allocated for the UE are carried. The V-PCRF associates the gateway control session established in Step 1202 with the IP-CAN session established in Step 1208 according to the user ID and the PDN ID.

In other embodiments, if the message sent in Step 1202 from the ePDG to the PCRF is a DHCP request message, then the V-PCRF associates the DHCP request message in Step 1202 with the message in Step 1208.

It should be noted that Step 1208 includes Step 1208*a* and Step 1208*b* if the FMC PF serves as a separate network element entity.

Step 1208*a*: the V-PCRF sends the H-PCRF an S9 session modification message, in which the allocated IP address is carried.

Step 1208*b*: H-PCRF might update the PCC rules made in Step 1204 and returns them to the V-PCRF.

Step 1209: the V-PCRF sends the PCEF an IP-CAN session establishment acknowledgement message, wherein the PCC rules are carried.

Step 1210: the P-GW returns a proxy binding update message or a session establishment acknowledgement message to the ePDG.

The specific implementation of Step 1211 to Step 1215 is totally the same as that of Step 611 to Step 615 and no further description is repeated here.

Figure 13:
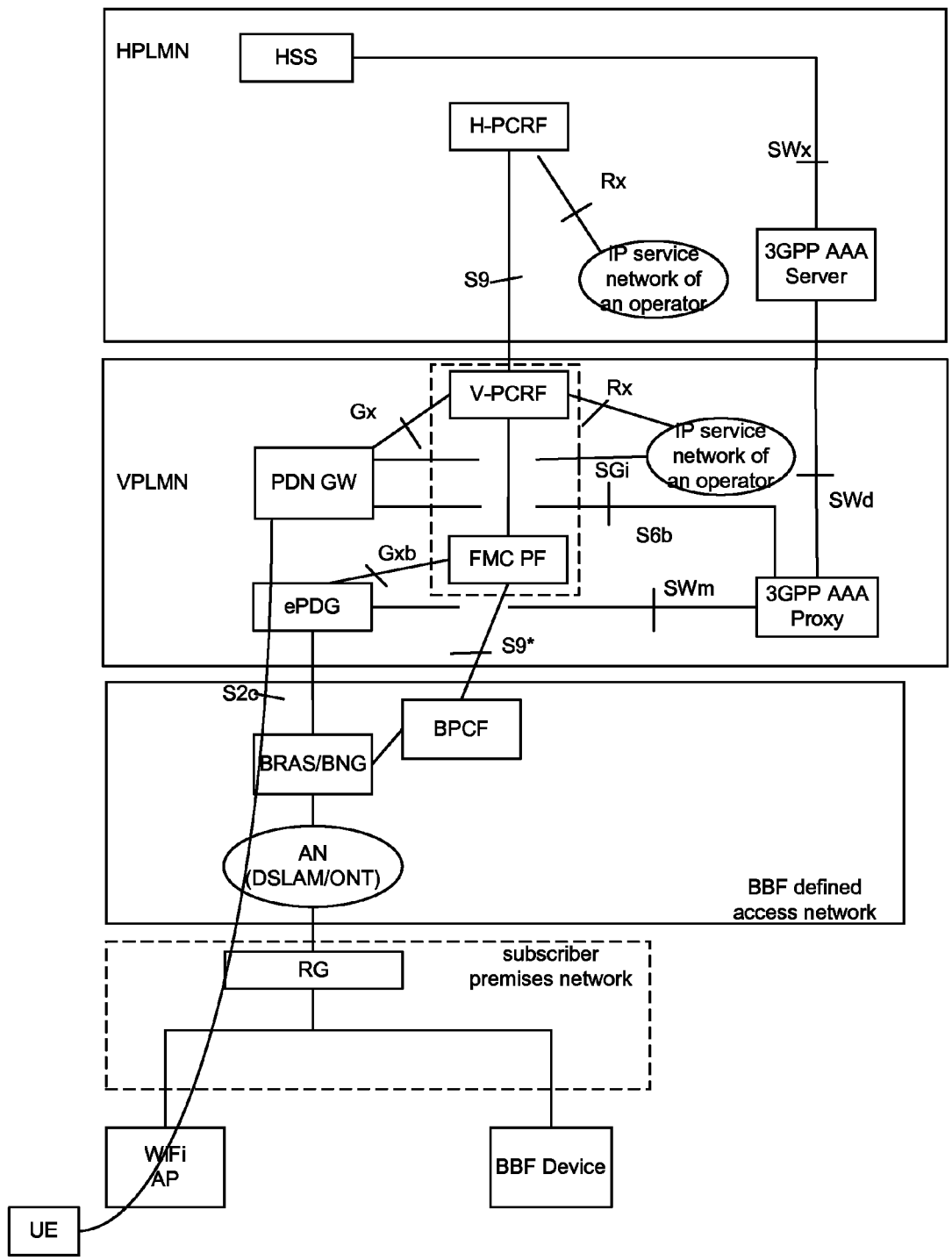
FIG. 13 shows a diagram illustrating the local breakout roaming scene in which a UE is accessed to a 3GPP core network through an untrusted fixed broadband access network according to the disclosure, in which the UE adopts a DSMIPv6 protocol to perform access.

FIG. 13 shows a diagram illustrating the local breakout roaming scene in which a UE is accessed to a 3GPP core network through an untrusted fixed broadband access network according to the disclosure, in which the UE adopts a DSMIPv6 protocol for access. In FIG. 13, except the addition of FMC PF, other network entities and the connection relationships therebetween are the same as those in the conventional art. Therefore, FIG. 13 is easily understood for those skilled in the art and no further description is provided here.

Figure 14:
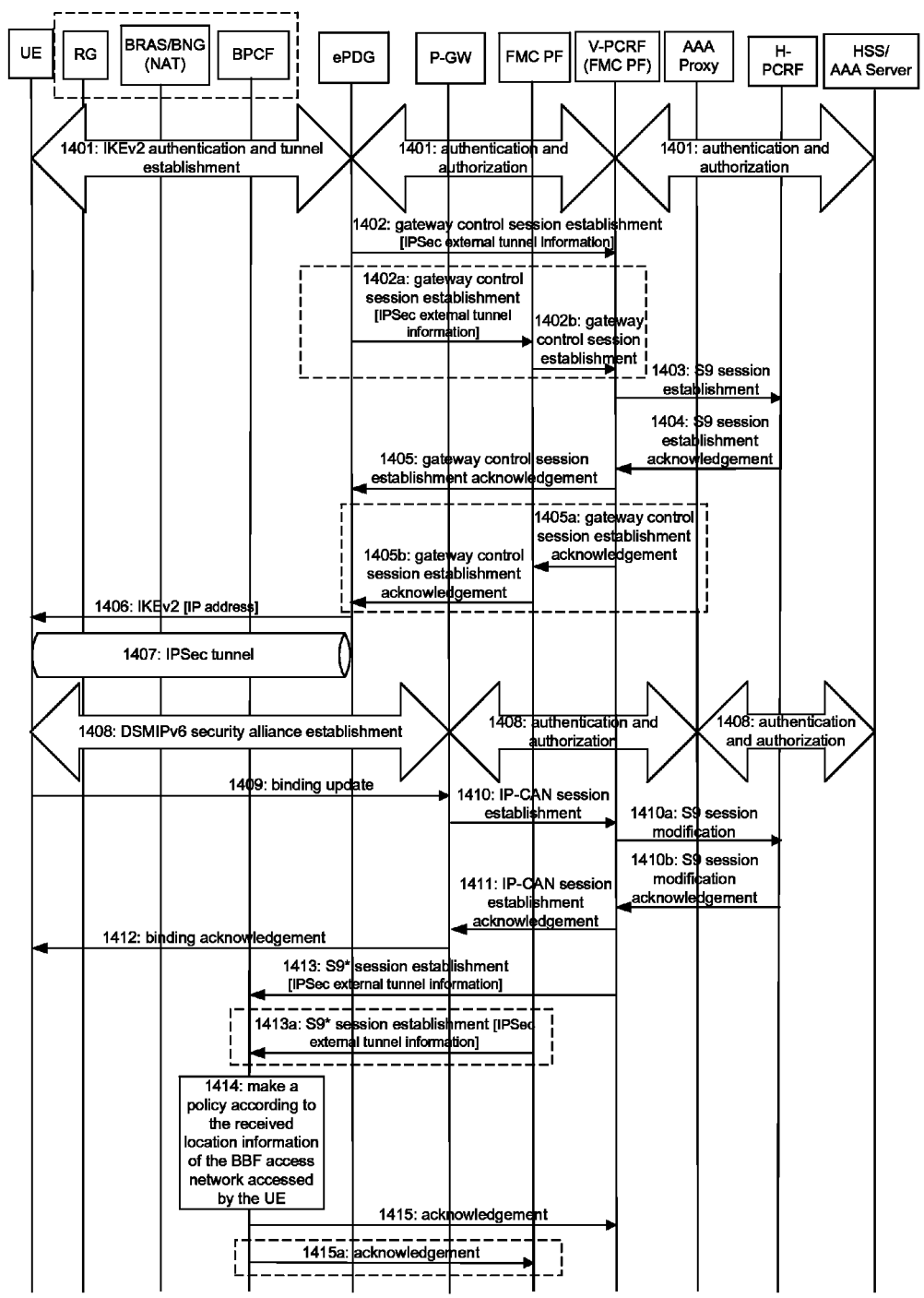
FIG. 14 shows an attachment flowchart in which a UE is accessed to a 3GPP core network through an untrusted fixed broadband access network based on the architecture shown in FIG. 13.

FIG. 14 shows an attachment flowchart in which a UE is accessed to a 3GPP core network through an untrusted fixed broadband access network based on the architecture shown in FIG. 13. Referring to FIG. 13 and FIG. 14, supposing an FMC PF is provided in a V-PCRF as the function enhancement of the V-PCRF in this embodiment, the specific implementation includes the following steps.

The specific implementation of Step 1401 to Step 1407 is totally the same as that of Step 1001 to Step 1007, and no further description is repeated here.

Step 1408: the UE performs a bootstrapping process. The UE performs DNS search according to an APN so as to acquire the IP address of the P-GW of the PDN to be accessed by the UE, wherein the P-GW is located in a visited place. In order to protect the DSMIPv6 message between the UE and the P-GW, the UE establishes a security alliance using the IKEv2 and adopts the EAP to perform authentication. The P-GW communicates with the AAA Server (the AAA Server further interacts with the HSS) through the AAA proxy to complete the EAP authentication, meanwhile the P-GW allocates an IPv6 address or a prefix for the UE which serves as the HoA of the UE.

Step 1409: the UE sends the P-GW a DSMIPv6 binding update message in which the CoA and the HoA are carried, wherein the life cycle parameter in the binding message is not 0. The P-GW establishes a binding context.

Step 1410: a PCEF in the P-GW sends the V-PCRF an IP-CAN session establishment indication message, wherein the user ID and the PDN ID are carried. The V-PCRF associates the gateway control session in Step 1402 with the IP-CAN session in Step 1410 according to the user ID.

In other embodiments, if the message sent in Step 1402 from the ePDG to the PCRF is a DHCP request message, then the V-PCRF associates the DHCP request message in Step 1402 with the message in Step 1410.

It should be noted that Step 1410 includes Step 1410a and Step 1410b if the FMC PF serves as a separate network element entity.

Step 1410a: the V-PCRF sends the H-PCRF an S9 session modification message in which the IP address is carried.

Step 1410b: the H-PCRF makes PCC rules. The H-PCRF returns the PCC rules to the V-PCRF.

The specific implementation of Step 1411 to Step 1415 is totally the same as that of Step 1011 to Step 1015, and no further description is repeated here.

Figure 15:
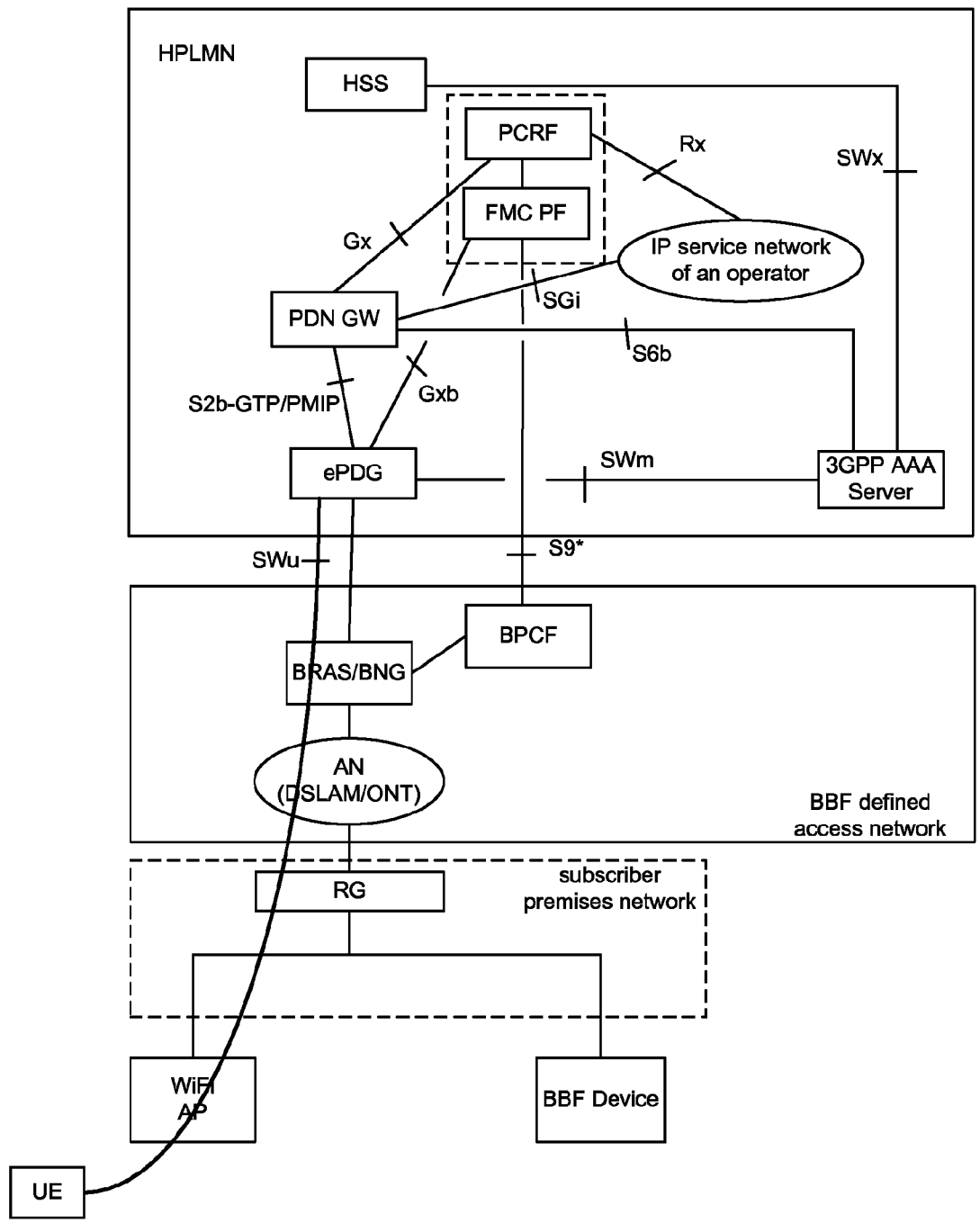
FIG. 15 shows a diagram illustrating the non-roaming scene in which a UE is accessed to a 3GPP core network through an untrusted fixed broadband access network according to the disclosure, in which a GTP or PMIPv6 protocol is adopted between an ePDG and a P-GW.
Figure 16:
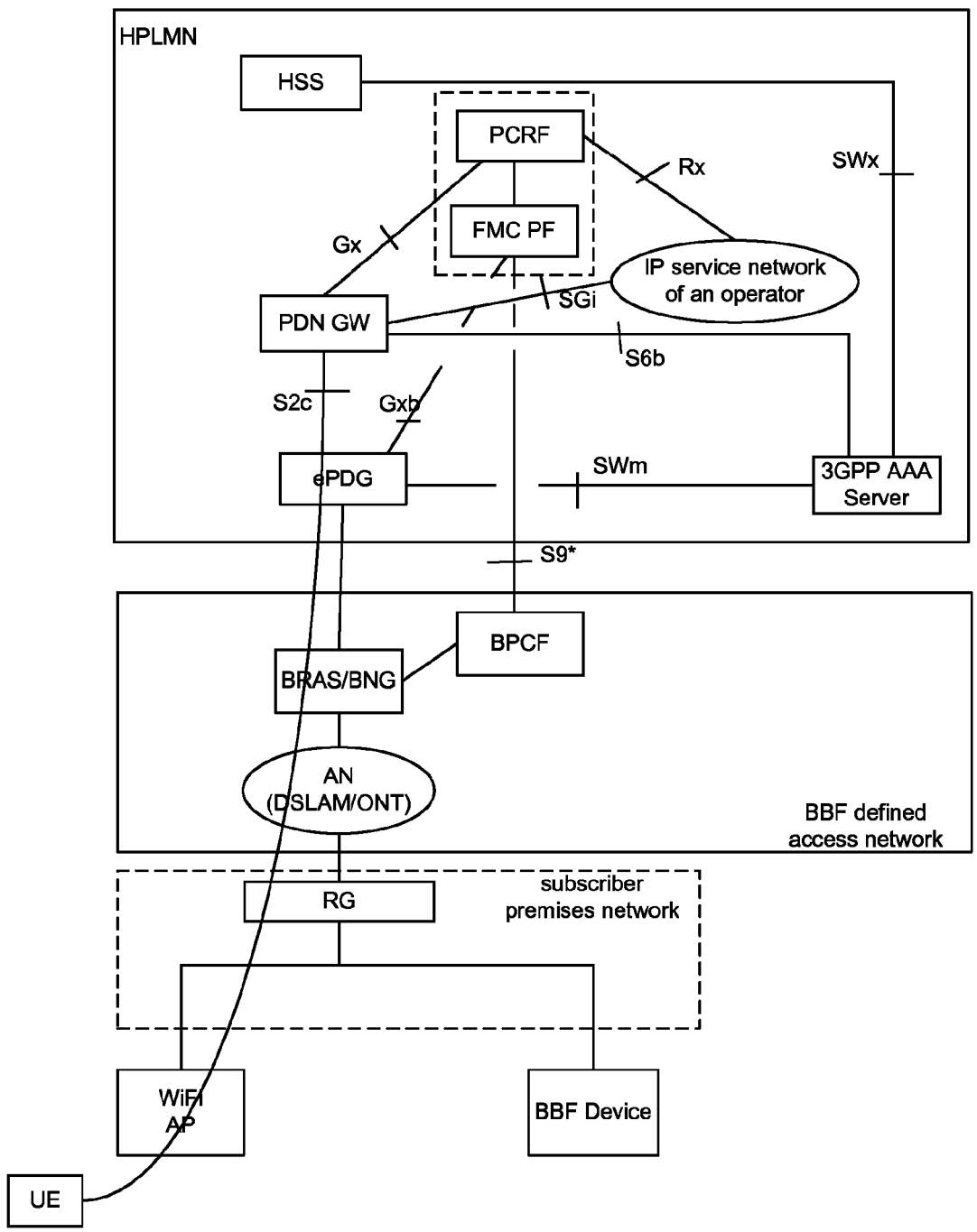
FIG. 16 shows a diagram illustrating the non-roaming scene in which a UE is accessed to a 3GPP core network through an untrusted fixed broadband access network according to the disclosure, in which the UE adopts a DSMIPv6 protocol to perform access.

FIG. 15 shows a diagram illustrating the non-roaming scene in which a UE is accessed to a 3GPP core network through an untrusted fixed broadband access network according to the disclosure, in which a GTP or PMIPv6 protocol is adopted between an ePDG and a P-GW. For the attachment flow based on this architecture, it is only needed to use a PCRF to replace the V-PCRF in the process of FIG. 12 and to avoid all the interaction processes between the V-PCRF and the H-PCRF. FIG. 16 shows a diagram illustrating the non-roaming scene in which a UE is accessed to a 3GPP core network through an untrusted fixed broadband access network according to the disclosure, in which the UE adopts a DSMIPv6 protocol to perform access. For the attachment flow based on this architecture, it is only needed to use a PCRF to replace the V-PCRF in the process of FIG. 14 and to avoid all the interaction processes between the V-PCRF and the H-PCRF. The specific implementation of the flow is easily understood by those skilled in the art according to the above embodiments and no further description is provided here.

After the UE is accessed to the 3GPP core network through the fixed broadband access network, the policy may change. For instance, the PCRF (or a Home PCRF (H-PCRF) in a roaming scene) makes a policy after receiving service information provided by an AF or a resource modification request message initiated by the UE, and the BPCF is requested to authorize bandwidth after the FMC PF receives changed PCC rules, then the BPCF performs the resource admission control according to the request. A detailed description is provided below in conjunction with embodiments.

Figure 17:
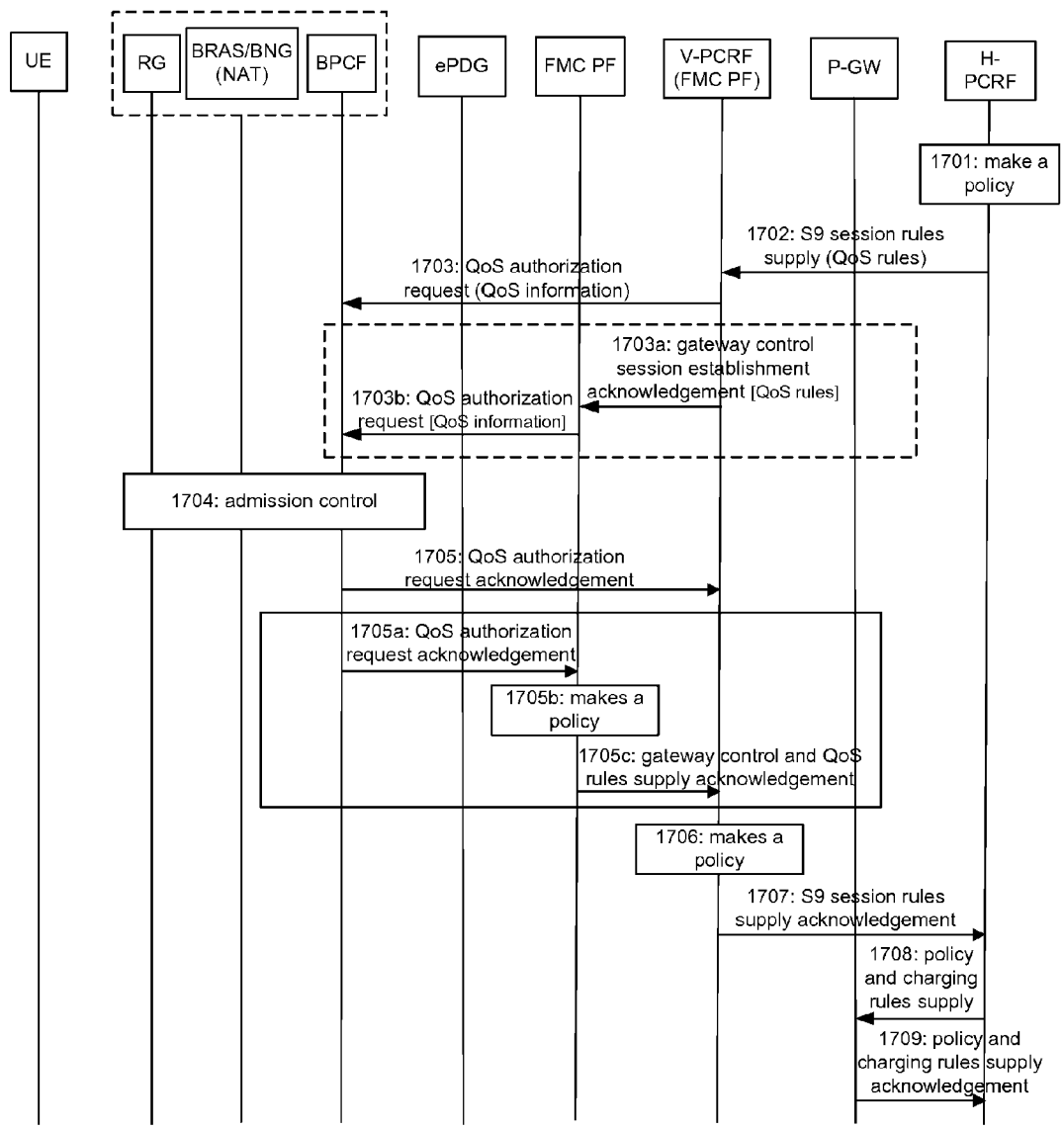
FIG. 17 shows a flowchart in which a PCRF requests a BPCF to perform QoS authorization when making polices in the home routed roaming scene according to the disclosure.

FIG. 17 shows a flowchart in which an H-PCRF requests a BPCF to perform the admission control when making polices in the home routed roaming scene (the architectures of FIG. 5 and FIG. 9) according to the disclosure. Supposing an FMC PF is provided in a V-PCRF as the function enhancement of the V-PCRF in this embodiment, the specific process includes the following steps.

Step 1701: the H-PCRF makes a policy after receiving the service information provided by an AF or a resource modification request message initiated by a UE, wherein the policy decision may be made through the following three ways.

Way 1: if the AF provides new service information or the UE initiates a new resource allocation request, then the H-PCRF performs QoS authorization and makes PCC rules and corresponding QoS rules. The QoS information of the PCC rules and the QoS rules include QoS Class Identifier (QCI), ARP (Allocation and Retention Priority), GBR (Guaranteed Bit Rate) and Maximum Bit Rate (MBR).

Way 2: if the AF notifies termination of service or the UE initiates a resource release request, the H-PCRF performs QoS authorization, and decides to delete or deactivate corresponding PCC rules and QoS rules, wherein the QoS information of the PCC rules and the QoS rules to be deleted or deactivated includes QCI, ARP, GBR and MBR.

Way 3: if the AF modifies the service information already provided or the UE requests to modify the resource already allocated, then the H-PCRF performs QoS authorization and updates the made PCC rules and QoS rules, wherein the PCC rules and the QoS information of the QoS rules includes QCI, ARP, GBR and MBR.

Step 1702: the H-PCRF sends an S9 session rules supply message to the V-PCRF.

If the H-PCRF makes a policy through Way 1, then the H-PCRF carries the information of newly made QoS rules in the S9 session rules supply message.

If the H-PCRF makes a policy through Way 2, then the H-PCRF carries the information that indicates delete or deactivate the QoS rules in the S9 session rules supply message.

If the H-PCRF makes a policy through Way 3, then the H-PCRF carries the information of the updated QoS rules in the S9 session rules supply message.

Step 1703: the V-PCRF sends a QoS authorization request message to the BPCF to request the BPCF to perform QoS authorization.

If the H-PCRF makes a policy through Way 1, then the V-PCRF carries in the QoS authorization request message an indication of requesting to allocate resources and the GBR contained in the QoS information, so as to request the BPCF to allocate the bandwidth resource GBR.

If the H-PCRF makes a policy through Way 2, then the V-PCRF carries in the QoS authorization request message an indication of requesting to release resources and the GBR contained in the QoS information, so as to request the BPCF to release the bandwidth resource GBR.

If the H-PCRF makes a policy through Way 3, then the V-PCRF would send the request to the BPCF according to the increment (difference) between the GBR contained in the updated QoS information and the GBR already allocated. If the GBR after update is reduced relative to the GBR already allocated, the GBR that the V-PCRF carries in the QoS authorization request message is the increment of the GBR and the V-PCRF carries an indication of requesting to release resources in the QoS authorization request message. If the GBR after update is increased relative to the allocated GBR, the GBR that the V-PCRF carries in the QoS authorization request message is the increment of the GBR and the V-PCRF carries an indication of requesting to allocate resources in the QoS authorization request message. It should be noted that Step 1703 includes Step 1703a and Step 1703b if the FMC PF serves as a separate network element entity.

Step 1703a: the V-PCRF sends the FMC PF a gateway control and QoS rules supply message, which is carried with the information received by the V-PCRF from the H-PCRF.

Step 1703b: the FMC PF sends the QoS authorization request message to the BPCF to request the BPCF to perform QoS authorization, wherein the content thereof is the same as that in Step 1703.

Step 1704: the BPCF implements a corresponding policy according to the request message from the V-PCRF.

If the BPCF receives a request for allocating the bandwidth resource GBR, the BPCF performs the resource admission according to the currently available bandwidth of a subscribed fixed-network line. If the rest available bandwidth is greater than or equal to the GBR, the BPCF accepts the request of the V-PCRF and returns an acceptance acknowledgement message to the V-PCRF, and meanwhile, the BPCF deducts the GBR from the currently available bandwidth of the subscribed fixed-network line. If the rest available bandwidth is less than GBR, the BPCF rejects the request of the V-PCRF, returns a rejection message carrying the bandwidth that the BPCF can accept to the V-PCRF.

If the BPCF receives a request for releasing the bandwidth resource GBR, the BPCF returns an acceptance acknowledgement message directly, and meanwhile the BPCF adds the GBR to the currently available bandwidth of the subscribed fixed-network line.

In addition, the V-PCRF or FMC PF can provide to the BPCF the QoS rules which are provided by the H-PCRF. The BPCF decides whether to accept or reject the QoS authorization request after performing the resource admission control (When performing the resource admission control, the BPCF would also consider the QCI and/or ARP comprehensively besides considering whether the currently available rest bandwidth can meet the requested bandwidth).

The BPCF may also forward the request message from the V-PCRF to other network elements (for example, BNG) of the fixed broadband access network, and then this network element implements similar policy and returns the resource admission result to the BPCF.

Step 1705: the BPCF returns to the V-PCRF a QoS authorization request acknowledgement message in which the information of the policy implemented in Step 1704 is carried.

It should be noted that Step 1705 includes Step 1705*a* and Step 1705*b* if the FMC PF serves as a separate network element entity.

Step 1705*a*: the BPCF returns to the FMC PF the QoS authorization request acknowledgement message in which the information of the policy implemented in Step 1704 is carried.

Step 1705*b*: the FMC PF makes a policy according to the message returned from the BPCF.

If the FMC PF receives an acceptance acknowledgement message (including receiving resource allocation and resource release), then the FMC PF executes Step 1705*c* and an acceptance indication is carried.

If the FMC PF receives a rejection message, the V-PCRF would perform resource pre-emption according to the ARP in the QoS information, the resource pre-emption including the following logic judgments: the FMC PF compares, according to the ARP, this QoS information with other authorized QoS information of the user and with the authorized QoS information of all other users who are accessed through the same broadband line, if this QoS information can not pre-empt the resources of other QoS information, then the FMC PF executes Step 1705*c* and a rejection indication is carried; if the QoS information can pre-empt the resources of the authorized QoS information of other users, then the FMC PF initiates a process of authorizing pre-empted QoS information (this process may be implemented through an existing process of deleting and deactivating QoS rules). In addition, the FMC PF sends again a broadband session QoS request message to the BPCF, the BPCF allocates the bandwidth and sends an acknowledgement message, and the FMC PF executes Step 1705*c* and an acceptance indication is carried.

Step 1706: the V-PCRF makes a policy according to the message returned from the BPCF.

If the V-PCRF receives an acceptance acknowledgement message (including receiving resource allocation and resource release), then the V-PCRF executes Step 1707 and an acceptance indication is carried.

If the V-PCRF receives a rejection message, the V-PCRF would perform the following logic judgments according to the ARP in the QoS information: the V-PCRF compares, according to the ARP, this QoS information with other authorized QoS information of the user and with the authorized QoS information of all other users who are accessed through the same broadband line, if this QoS information can not pre-empt the resources of other QoS information, then the V-PCRF executes Step 1707 and a rejection indication is carried; if the QoS information can pre-empt the resources of the authorized QoS information of other users, the V-PCRF initiates a process of authorizing pre-empted QoS information (this process may be implemented through an existing process of deleting and deactivating QoS rules). In addition, the V-PCRF sends again a broadband session QoS request message to the BPCF, the BPCF allocates the bandwidth and sends an acknowledgement message, and the V-PCRF executes Step 1707 and an acceptance indication is carried.

Step 1707: the V-PCRF returns an S9 session rules supply acknowledgement message to the H-PCRF to notify the H-PCRF whether the request is accepted or rejected.

Step 1708: if the returned message is an acceptance indication, the H-PCRF sends the PCEF a policy and charging rules supply message carrying the PCC rules.

Step 1709: the PCEF returns an acknowledgement message to the H-PCRF.

Figure 18:
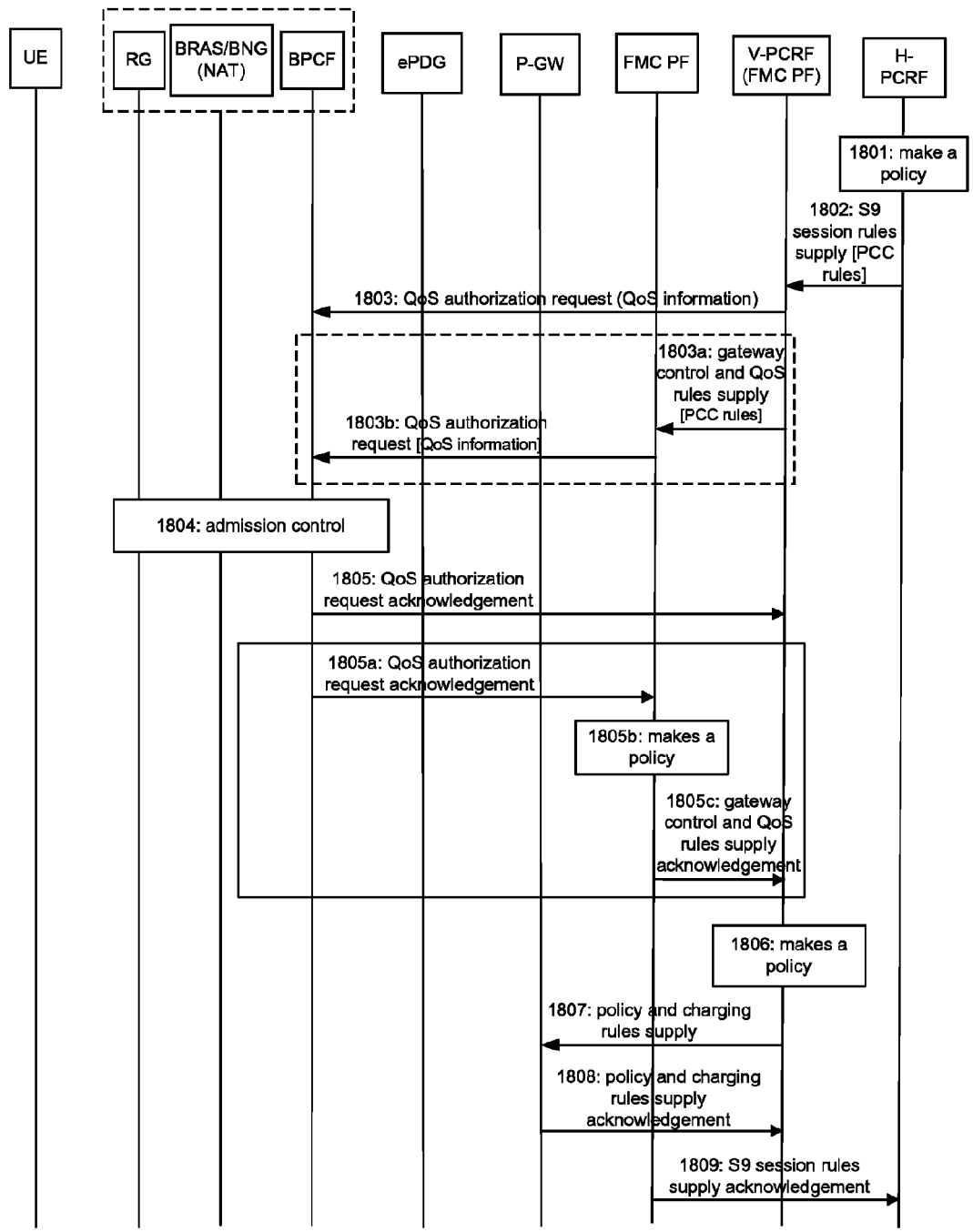
FIG. 18 shows a flowchart in which a PCRF requests a BPCF to perform QoS authorization when making polices in the local breakout roaming scene according to the disclosure.

FIG. 18 shows a flowchart in which an H-PCRF requests a BPCF to perform the admission control when making polices in the local breakout roaming scene (the architecture of FIG. 11 and FIG. 13) according to the disclosure. Supposing an FMC PF is provided in a V-PCRF as the function enhancement of the V-PCRF in this embodiment, the specific process includes the following steps.

Step 1801: the H-PCRF makes a policy after receiving the service information provided by an AF or a resource modification request message initiated by a UE, wherein the policy decision may be made through the following three ways.

Way 1: if the AF provides new service information or the UE initiates a new resource allocation request, then the H-PCRF performs QoS authorization and makes PCC rules. The QoS information of the PCC rules includes QCI, ARP, GBR and MBR.

Way 2: if the AF notifies termination of service or the UE initiates a resource release request, the H-PCRF performs QoS authorization, and decides to delete or deactivate corresponding PCC rules, wherein the QoS information of the PCC rules to be deleted or deactivated includes QCI, ARP, GBR and MBR.

Way 3: if the AF modifies the service information already provided or the UE requests to modify the resource already allocated, then the H-PCRF performs QoS authorization and updates the made PCC rules, wherein the QoS information of the PCC rules and the QoS rules includes QCI, ARP, GBR and MBR.

Step 1802: the H-PCRF sends an S9 session rules supply message to the V-PCRF.

If the H-PCRF makes a policy through Way 1, then the H-PCRF carries the information of newly made PCC rules in the S9 session rules supply message.

If the H-PCRF makes a policy through Way 2, then the H-PCRF carries the information that indicates to delete or deactivate the PCC rules in the S9 session rules supply message.

If the H-PCRF makes a policy through Way 3, then the H-PCRF carries the information of the updated PCC rules in the S9 session rules supply message.

The specific implementation of Step 1803 to Step 1806 is totally the same as that of Step 1703 to Step 1706, and no further description is repeated here.

Step 1807: if the V-PCRF receives an acceptance indication, the V-PCRF sends a policy and charging rules supply message carried with the PCC rules to the PCEF.

Step 1808: the PCEF returns an acknowledgement message to the V-PCRF.

Step 1809: the V-PCRF returns an S9 session rules supply acknowledgement message to the H-PCRF to notify the H-PCRF whether the request is accepted or rejected.

Figure 19:
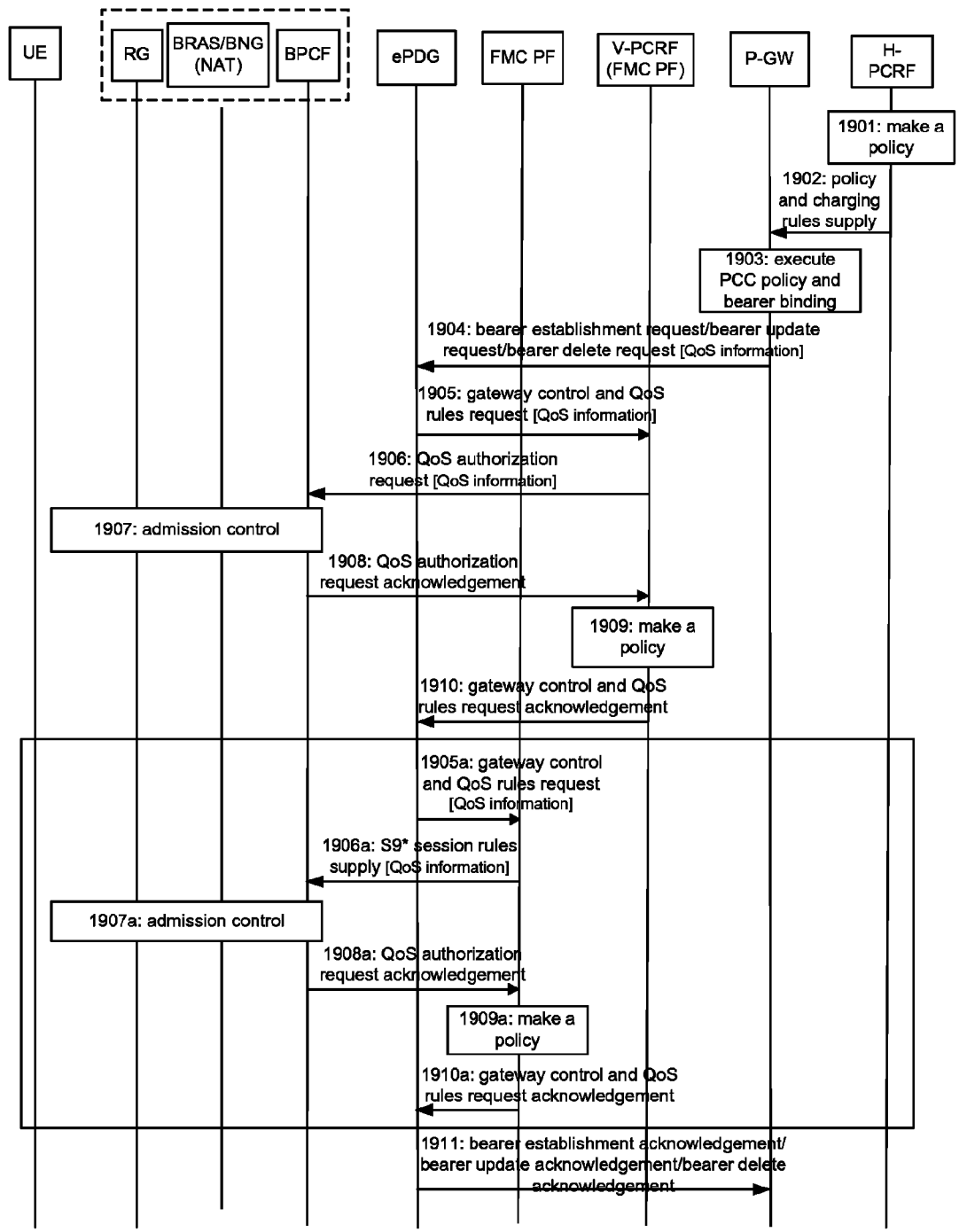
FIG. 19 shows a flowchart in which an H-PCRF requests a BPCF to perform QoS authorization when making polices in the home routed roaming scene according to the disclosure.

FIG. 19 shows a flowchart in which an H-PCRF requests a BPCF to perform the admission control when making polices in the home routed roaming scene (the architecture of FIG. 7) according to the disclosure. Supposing an FMC PF is provided in a V-PCRF as the function enhancement of the V-PCRF in this embodiment, the specific process includes the following steps.

Step 1901: the H-PCRF makes a policy after receiving the service information provided by an AF or a resource modification request message initiated by a UE, wherein the policy decision may made through the following three ways.

Way 1: if the AF provides new service information or the UE initiates a new resource allocation request, then the H-PCRF performs QoS authorization and makes PCC rules. The QoS information of the PCC rules includes QCI, ARP, GBR and MBR.

Way 2: if the AF notifies termination of service or the UE initiates a resource release request, the H-PCRF performs QoS authorization, and decides to delete or deactivate corresponding PCC rules, wherein the QoS information of the PCC rules to be deleted or deactivated includes QCI, ARP, GBR and MBR.

Way 3: if the AF modifies the provided service information or the UE requests to modify the resource already allocated, then the H-PCRF performs QoS authorization and updates the made PCC rules, wherein the QoS information of the PCC rules includes QCI, ARP, GBR and MBR.

Step 1902: the H-PCRF sends the P-GW a policy and charging rules supply message carried with the PCC rules.

Step 1903: the P-GW executes the PCC rules and executes bearing binding.

Step 1904: the P-GW sends a bearer establishment request or a bearer update request or a bearer delete request to the ePDG according to the result of bearer binding, and the QoS information is carried in the message.

Step 1905: the ePDG sends a gateway control and QoS rules request message to the V-PCRF, wherein the QoS information is carried in the gateway control and QoS rules request message.

If the message received by the ePDG is a bearer establishment request, the ePDG carries in the gateway control and QoS rules request message an indication of requesting to allocate resources and the GBR contained in the QoS information, so as to request the V-PCRF to allocate the bandwidth resource GBR.

If the message received by the ePDG is a bearer delete request, the ePDG carries in the gateway control and QoS rules request message an indication of requesting to release resources and the GBR contained in the QoS information, so as to request the V-PCRF to release bandwidth resource GBR.

If the message received by the ePDG is a bearer update request, the ePDG would send a request to the V-PCRF according to the increment between the GBR contained in the updated QoS information and the GBR already allocated. If the GBR after update is reduced relative to the GBR already allocated, the GBR that the ePDG carries in the gateway control and QoS rules request message is the increment of the GBR and the ePDG carries an indication of requesting to release resources in the gateway control and QoS rules request message. If the GBR after update is increased relative to the GBR already allocated, the GBR that the ePDG carries in the gateway control and QoS rules request message is the increment of the GBR and the ePDG carries an indication of requesting to allocate resources in the gateway control and QoS rules request message.

Step 1906: the V-PCRF sends the BPCF a QoS authorization request carried with the QoS information acquired in Step 1905.

Step 1907: the BPCF implements a corresponding policy according to the request message from the V-PCRF.

If the BPCF receives a request for allocating bandwidth resource GBR, the BPCF performs the resource admission according to the currently available bandwidth of a subscribed fixed-network line. If the rest available bandwidth is greater than or equal to the GBR, the BPCF accepts the request of the V-PCRF and returns an acceptance acknowledgement message to the V-PCRF, and meanwhile, the BPCF deducts the GBR from the currently available bandwidth of the subscribed fixed-network line. If the rest available bandwidth is less than GBR, the BPCF rejects the request of the V-PCRF, returns a rejection message carrying the bandwidth that the BPCF can accept to the V-PCRF.

If the BPCF receives a request for releasing bandwidth resource GBR, the BPCF returns an acceptance acknowledgement message directly, and meanwhile the BPCF adds the GBR to the currently available bandwidth of the subscribed fixed-network line.

In addition, the QoS information provided to the V-PCRF or FMC PF by the ePDG may also include QCI, ARP and the like, and the V-PCRF or FMC PF may further provide this information to the BPCF. The BPCF decides whether to accept or reject the QoS authorization request after performing the resource admission control (when performing the resource admission control, the BPCF would also consider the QCI and/or ARP comprehensively besides considering whether the currently available rest bandwidth can meet the requested bandwidth).

Step 1908: the BPCF returns to the V-PCRF a QoS authorization request acknowledgement message carried with the information of the policy implemented in Step 1907.

Step 1909: the V-PCRF makes a policy according to the message returned from the BPCF.

If the V-PCRF receives an acceptance acknowledgement message (including receiving resource allocation and resource release), the V-PCRF executes Step 1910 and an acceptance indication is carried.

If the V-PCRF receives a rejection message, the V-PCRF would perform the following logic judgments according to the ARP in the QoS information: the V-PCRF compares, according to the ARP, this QoS information with other authorized QoS information of the user and with the authorized QoS information of all other users who are accessed through the same broadband line, if this QoS information can not pre-empt the resource of other QoS information, then the V-PCRF executes Step 1910 and a rejection indication is carried; if the QoS information can pre-empt the resources of the authorized QoS information of other users, then the V-PCRF initiates a process of authorizing pre-empted QoS information (this process may be implemented through an existing process of deleting and deactivating QoS rules). In addition, the V-PCRF sends again a broadband session QoS request message to the BPCF, the BPCF allocates the bandwidth and sends an acknowledgement message, and the V-PCRF executes Step 1910 and an acceptance indication is carried.

Step 1910: the V-PCRF returns to the ePDG an acknowledgement message carried with the acceptance or rejection indication.

It should be noted that Step 1905*a* to Step 1910*a* is executed to replace the above Step 1905 to Step 1910 if the FMC PF serves as a separate network element entity, wherein Step 1905*a* to Step 1910*a* is similar to Step 1905 to Step 1910, and the difference lies in that the FMC PF is adopted to replace the V-PCRF.

Step 1911: the ePDG returns to the P-GW an acknowledgement message carried with an acceptance or rejection message.

In the scene of non-roaming (FIG. 15 and FIG. 16), for the process of the PCRF requesting the BPCF to perform the admission control when making polices, it is only needed to use the PCRF to replace the V-PCRF in the process of FIG. 18 and to avoid all the interaction processes between the V-PCRF and the H-PCRF.

The disclosure is not limited to the protocol and message types (for example, Diameter, Remote Authentication Dial In User Service (RADIUS), DHCP protocol and GPRS Tunnel Protocol (GTP)) interacted between the ePDG and the PCRF, between the ePDG and the V-PCRF or between the ePDG and the FMC PF. The purpose of the ePDG sending a message to the PCRF, V-PCRF or FMC PF is to trigger the PCRF, V-PCRF or FMC PF to initiate an establishment of S9* session with the BPCF and provide necessary information.

The above are only preferred embodiments of the disclosure and are not intended to limit the scope of protection of the disclosure. Any modification, equivalent substitute and improvement made within the s principle of the disclosure are deemed to be included within the scope of protection of the disclosure.

The invention claimed is:

1. A policy control method for accessing a fixed broadband access network, in which a Fixed Mobile Convergence Policy Function (FMC PF) is set in a mobile network which a user requests to be accessed to, comprising
    after the FMC PF receives a trigger message from an Evolved Packet Data Gateway (ePDG), requesting, by the FMC PF, a Broadband Policy Control Framework (BPCF) in the fixed broadband access network to establish a policy control session; and
    performing, by the fixed broadband access network, admission control according to Quality of Service (QoS) rules or QoS information transmitted from the FMC PF through the policy control session.

2. The policy control method according to claim 1, wherein the FMC PF serves as a separate function entity, or is integrated in a Policy and Charging Rules Function (PCRF).

3. The policy control method according to claim 1, wherein the trigger message received by the FMC PF from the ePDG is: a gateway control session establishment message carrying Internet Protocol Security (IPSec) external tunnel information or a Dynamic Host Configuration Protocol (DHCP) request message carrying IPSec external tunnel information;
    wherein the IPSec external tunnel information comprises a User Equipment (UE) local IP address received by the ePDG.

4. The policy control method according to claim 3, wherein requesting, by the FMC PF, the BPCF to establish a policy control session comprises:
    determining, by the FMC PF, the BPCF of the fixed broadband access network accessed by the UE or the entry point of the fixed broadband access network in which the BPCF is located according to the UE local IP address, and sending, by the FMC PF, an S9* session establishment message to the BPCF, wherein the S9* session establishment message is carried with the IPSec external tunnel information.

5. The policy control method according to claim 4, wherein the IPSec external tunnel information comprises a source port number.

6. The policy control method according to claim 3, wherein the IPSec external tunnel information comprises a source port number.

7. The policy control method according to claim 1, wherein
    when the user is a non-roaming user, the mobile network which the user requests to be accessed to is the Public Land Mobile Network (PLMN) to which the user belongs;
    when the user is a roaming user, the mobile network which the user requests to be accessed to is the PLMN that the user visits.

8. The policy control method according to claim 1, wherein requesting to establish a policy control session and performing, by the fixed broadband access network, admission control comprise:
    after the FMC PF acquires Policy and Charging Control (PCC) rules, QoS rules or a QoS request, transmitting, by the FMC PF, the QoS rules or QoS information to the BPCF through the policy control session.

9. The policy control method according to claim 8, wherein the FMC PF serves as a separate function entity, acquiring, by the FMC PF, the QoS rules or the QoS information comprises:
    acquiring, by the FMC PF, the PCC rules or the QoS rules from a PCRF; or
    acquiring, by the FMC PF, the QoS request from the ePDG.

10. The policy control method according to claim 9, wherein performing, by the fixed broadband access network, resource admission control according to a request comprises:
    if the BPCF receives a request for allocating bandwidth resource GBR (Guaranteed Bit Rate), performing, by the fixed broadband access network, the resource admission control according to the currently available bandwidth of a subscribed fixed-network line:
        when the rest available bandwidth is greater than or equal to the GBR, accepting, by the fixed broadband access network, the request of the FMC PF of the mobile network which the user requests to be accessed to; returning, by the fixed broadband access network, an acceptance acknowledgement message to the FMC PF of the mobile network which the user requests to be accessed to; and deducting, by the fixed broadband access network, the GBR from the currently available bandwidth of the subscribed fixed-network line,
        when the rest available bandwidth is less than the GBR, rejecting, by the fixed broadband access network, the request of the FMC PF of the mobile network which the user requests to be accessed to; and returning, by the fixed broadband access network, a rejection message to the FMC PF of the mobile network which the user requests to be accessed to, wherein the rejection message is carried with the bandwidth that the fixed broadband access network can accept,
    if the BPCF receives a request for releasing the bandwidth resource GBR, returning, by the BPCF, an acceptance acknowledgement message; and adding, by the fixed broadband access network, the GBR to the currently available bandwidth of the subscribed fixed-network line.

11. The policy control method according to claim 10, wherein if the FMC PF receives the rejection message, the method further comprising:
performing, by the FMC PF, resource pre-emption according to an Allocation and Retention Priority (ARP).

12. The policy control method according to claim 8, wherein the FMC PF is integrated in a PCRF; acquiring, by the FMC PF, the PCC rules, the QoS rule or the QoS request comprises:
when the user is a non-roaming user, making the PCC rules and/or the QoS rules by the PCRF; when the user is a roaming user, acquiring, by the PCRF, the PCC rules or the QoS rules from a PCRF of the PLMN to which the user belongs; or
acquiring, by the PCRF, the QoS request from the ePDG.

13. The policy control method according to claim 12, wherein performing, by the fixed broadband access network, resource admission control according to a request comprises:
if the BPCF receives a request for allocating bandwidth resource GBR (Guaranteed Bit Rate), performing, by the fixed broadband access network, the resource admission control according to the currently available bandwidth of a subscribed fixed-network line:
when the rest available bandwidth is greater than or equal to the GBR, accepting, by the fixed broadband access network, the request of the FMC PF of the mobile network which the user requests to be accessed to; returning, by the fixed broadband access network, an acceptance acknowledgement message to the FMC PF of the mobile network which the user requests to be accessed to; and deducting, by the fixed broadband access network, the GBR from the currently available bandwidth of the subscribed fixed-network line,
when the rest available bandwidth is less than the GBR, rejecting, by the fixed broadband access network, the request of the FMC PF of the mobile network which the user requests to be accessed to; and returning, by the fixed broadband access network, a rejection message to the FMC PF of the mobile network which the user requests to be accessed to, wherein the rejection message is carried with the bandwidth that the fixed broadband access network can accept,
if the BPCF receives a request for releasing the bandwidth resource GBR, returning, by the BPCF, an acceptance acknowledgement message; and adding, by the fixed broadband access network, the GBR to the currently available bandwidth of the subscribed fixed-network line.

14. The policy control method according to claim 13, wherein if the FMC PF receives the rejection message, the method further comprising:
performing, by the FMC PF, resource pre-emption according to an Allocation and Retention Priority (ARP).

15. A policy control system for accessing a fixed broadband access network, at least comprising an Evolved Packet Data Gateway (ePDG), a Fixed Mobile Convergence Policy Function (FMC PF) and a Broadband Policy Control Framework (BPCF), wherein
the ePDG is configured to send a trigger message to the FMC PF;
the FMC PF is set in a mobile network which a user requests to be accessed to and is configured to receive the trigger message from the ePDG and to request the BPCF to establish a policy control session; and
the BPCF is configured to receive the request from the FMC PF and to perform admission control according to QoS rules or QoS information transmitted through the policy control session or to delegate another network element of the fixed broadband access network to perform the admission control.

16. The policy control system according to claim 15, wherein
the FMC PF is configured to acquire PCC rules, QoS rules or a QoS request containing GBR, and to transmit the QoS rules or QoS information to the BPCF through the policy control session.

17. The policy control system according to claim 16, wherein the FMC PF serves as a separate function entity,
the system further comprising a PCRF which is configured to provide the PCC rules or the QoS rules to the FMC PF; or
the ePDG is further configured to provide the QoS request to the FMC PF.

18. The policy control system according to claim 16, wherein when the FMC PF receives a rejection message from the BPCF, the FMC PF is configured to perform resource pre-emption according to an ARP.

19. The policy control system according to claim 15, wherein the FMC PF is integrated in a PCRF,
the PCRF is configured to make PCC rules or QoS rules when the user is a non-roaming user, and to acquire the PCC rules or the QoS rules from a PCRF of the PLMN to which the user belongs when the user is a roaming user; or
the PCRF is configured to acquire the QoS request from the ePDG.

* * * * *